US012640463B1

(12) United States Patent
Bench et al.

(10) Patent No.: US 12,640,463 B1
(45) Date of Patent: May 26, 2026

(54) ANTENNAS, MULTI-ANTENNA APPARATUS, AND ANTENNA HOUSINGS

(71) Applicant: SeeScan, Inc., San Diego, CA (US)

(72) Inventors: Stephanie M. Bench, Sandersville, GA (US); Mark S. Olsson, La Jolla, CA (US)

(73) Assignee: SeeScan, Inc., San Diego, CA (US)

( * ) Notice: Subject to any disclaimer, the term of this patent is extended or adjusted under 35 U.S.C. 154(b) by 189 days.

(21) Appl. No.: 18/424,422

(22) Filed: Jan. 26, 2024

Related U.S. Application Data

(63) Continuation of application No. 17/687,538, filed on Mar. 4, 2022, now Pat. No. 11,909,104.

(60) Provisional application No. 63/156,355, filed on Mar. 4, 2021.

(51) Int. Cl.

| | |
|---|---|
| ***H01Q 1/24*** | (2006.01) |
| ***H01Q 1/20*** | (2006.01) |
| ***H01Q 1/28*** | (2006.01) |

(52) U.S. Cl.
CPC ............... *H01Q 1/288* (2013.01); *H01Q 1/20* (2013.01); *H01Q 1/241* (2013.01)

(58) Field of Classification Search
CPC .......... H01Q 1/20; H01Q 1/22; H01Q 1/2291; H01Q 1/24; H01Q 1/241; H01Q 1/288
See application file for complete search history.

(56) References Cited

U.S. PATENT DOCUMENTS

| | | | | |
|---|---|---|---|---|
| 10,483,633 | B2 * | 11/2019 | Wu | H01Q 5/307 |
| 11,050,131 | B2 * | 6/2021 | Wu | H01Q 1/12 |
| 11,876,283 | B1 * | 1/2024 | Bench | G01S 19/14 |
| 2016/0020521 | A1 * | 1/2016 | Astakhov | H01Q 1/48 343/769 |

* cited by examiner

*Primary Examiner* — Thai Pham
(74) *Attorney, Agent, or Firm* — Steven C. Tietsworth, Esq.; Michael J. Pennington, Esq.

(57) ABSTRACT

The disclosure relates to antennas for use in satellite positioning systems and other wireless bands. An antenna may include a UV resistance treated Polymethylpentene housing having enhanced dielectric properties.

14 Claims, 13 Drawing Sheets

ANTENNAS, MULTI-ANTENNA APPARATUS, AND ANTENNA HOUSINGS

CROSS-REFERENCE TO RELATED APPLICATIONS

This application claims priority under 35 U.S.C. § 119(e) to co-pending U.S. Provisional Patent Application Ser. No. 63/156,355, entitled ANTENNAS, MULTI-ANTENNA APPARATUS, AND ANTENNA HOUSINGS, filed on Mar. 4, 2021, the content of which is hereby incorporated by reference herein in its entirety for all purpose.

FIELD

This disclosure relates generally to antennas for receiving and transmitting wireless signals. More specifically, but not exclusively, the present disclosure relates to antennas for receiving and transmitting electromagnetic signals in the radio frequency bands, as well as multi-antenna assemblies for use in satellite navigation and radio frequency band antennas, and UV resistance treated Polymethylpentene housings and associated antennas.

BACKGROUND

The ever-growing complexity of modern electronic devices often requires that one or more wireless signals (e.g., microwave and radio signals) be transmitted and/or received in order to communicate information, receive data relating to geolocation or other data, and/or otherwise function (e.g., communicate via Bluetooth or Wi-Fi or other radio signals and/or receive GNSS signals or like signals). The transmitting and receiving of such signals may require one or more antennas to facilitate functionality of the device.

In many such devices, the one or more antennas are incorporated in close proximity to one another or other elements, generating a potential for cross-coupling of signals. In such configuration, cross-coupling of signals may negatively impact the function of the antenna(s) and the overall function of the associated device. For instance, a modern cell phone may receive GNSS signals to determine location while simultaneously communicating via cellular, Bluetooth, and/or other wireless signals. In designing such multi-signal/multi-antenna devices, special attention must be made to lessen cross-coupling of signals to ensure proper functioning of each antenna and associated receiver/transmitter. Likewise, in devices having multi-antenna assemblies or other assemblies requiring portioning of power or communication of electromagnetic signals to travel across, though, or near the antenna, cross-coupling of signals may occur from electromagnetic signals generated by the wiring or other such elements of a device. Existing multi-signal devices, especially where multi-antenna assemblies exist, may fail to efficiently prevent cross-coupling of signals, thus limiting the performance of the antennas and associated receivers/transmitters.

In addition to cross-coupling issues, modern antennas may be housed in materials having a suboptimal balance of dielectric properties (e.g., dielectric constant, loss tangent, or like properties that allow for optimal propagation of electromagnetic signals) and mechanical properties (e.g., tensile or yield strength, toughness, or the like) or other properties (e.g., survivability in heat or UV light or the like) that may strengthen the housing to protecting the internal antenna from impact or other damage. Often such housing materials are selected, in part, due to mechanical or like properties to improve surviving the environment in which the antenna is used at the cost of poor dielectric performance of the housing, thereby lessening the efficiency of the antenna.

Accordingly, there is a need in the art to address these and other problems resulting from cross-coupling of signals in antennas and assemblies of multiple antennas as well as materials used in antenna housings.

SUMMARY

This disclosure relates generally to antennas for receiving and transmitting electromagnetic signals. More specifically, but not exclusively, the present disclosure relates to antennas for receiving and transmitting electromagnetic signals generally in the radio frequency bands, multi-antenna assemblies that include satellite navigation and radio frequency band antennas, and UV resistance treated Polymethylpentene housings and associated antennas.

In one aspect, the present disclosure includes antennas, generally used for receiving and/or transmitting electromagnetic signals in the radio frequency band spectrum, which may further be used in multi-antenna assemblies or other assemblies requiring wiring to travel across, though, or nearby the antenna. The antenna may include a shielding element and a ground plane position parallel to one another. An array of conductive mast elements configured to receive radio signals and driven by electrical current to transmit signals may be positioned between the shielding and ground plane elements. A conductive and hollow tubular passage may also be positioned between and provide a passageway through the shielding and ground plane elements such that wiring may pass through the antenna. In the antenna, the array of mast elements and the tubular passage may be positioned relative to one another between the shielding element and ground plane element such that when the electrical current is supplied to drive the mast elements in transmitting radio signals, the radiation of signals from the driven mast elements in combination with that radiating off the non-driven tubular passage may have a substantially omnidirectional azimuthal radiation pattern.

In another aspect, transmission lines having different lengths and/or different impedances may be used to transmit current to mast elements. The lengths/impedances of transmission lines may be selected to control the radiation pattern of antennas in keeping with the present disclosure which may be substantially omnidirectional azimuthally.

In another aspect, the present disclosure may include a multi-antenna apparatus. The multi-antenna apparatus may include a housing enclosing a GNSS antenna element positioned on top of a radio antenna of the present invention. The radio antenna may be of the variety or share aspects with the other antennas of the present disclosure. For instance, the radio antenna may include a shielding element and a ground plane wherein the ground plane may substantially match the horizontal cross-section dimensions of the GNSS antenna and wherein each element is position parallel to one another. The shielding and ground plane elements may direct the radiation so as to not cross-couple with the GNSS signals to the extent possible. An array of conductive mast elements configured to receive radio signals and driven by electrical current to transmit radio signals may be positioned between the horizontal shielding and ground plane elements. A conductive and hollow tubular passage may also be positioned between and provide a passageway through the shielding and ground plane elements such that wiring may pass through the radio antenna for the portioning of power and data signals from the GNSS antenna, through the radio antenna, and further to a receiver. In the radio antenna, the array of mast elements and the tubular passage may be positioned relative to one another between the shielding element and ground plane element such that when the electrical current is supplied to drive the mast elements in transmitting radio signals, the radiation of radio signals from the driven mast elements in combination with that radiating off the non-driven tubular passage may have a substantially omnidirectional azimuthal radiation pattern.

In another aspect, the present disclosure may include an antenna having a housing that is or includes a UV resistance treated Polymethylpentene substrate and one or more conductive antenna elements. In some embodiments, the antenna element(s) may be formed in or on the Polymethylpentene substrate by selective plating one or more conductive circuit patterns. In other embodiments, the antenna element may be a conventional antenna seated in a UV resistance treated Polymethylpentene housing.

Various additional aspects, features, and functionality are further described below in conjunction with the appended Drawings.

BRIEF DESCRIPTION OF THE DRAWINGS

The present disclosure may be more fully appreciated in connection with the following detailed description taken in conjunction with the accompanying drawings, wherein.

DETAILED DESCRIPTION OF EMBODIMENTS

Figure 1A:
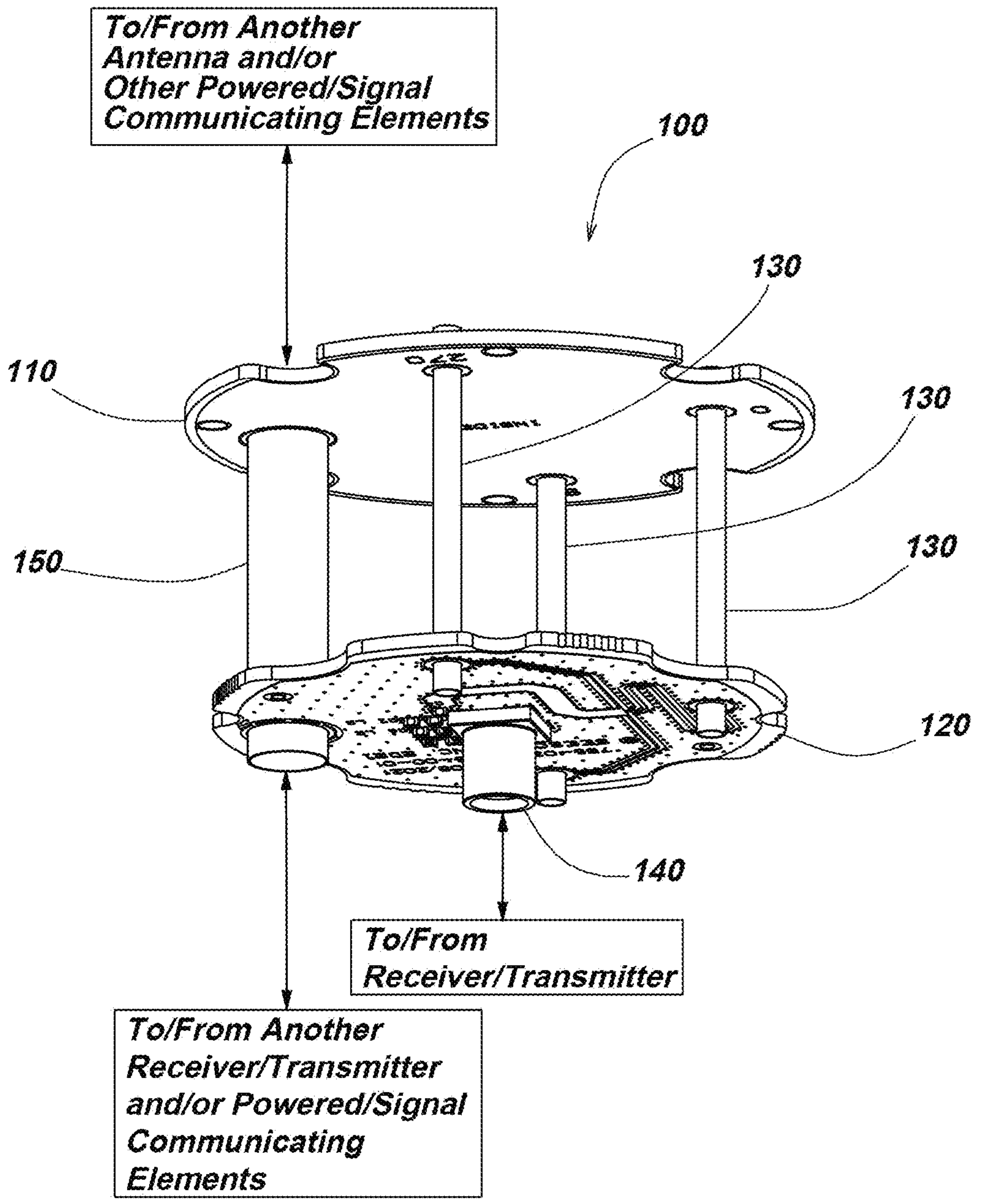
FIG. 1A is an isometric view of a radio antenna in keeping with the present disclosure.

The disclosure relates generally to antennas for receiving and transmitting electromagnetic signals. More specifically, but not exclusively, the present disclosure relates to antennas for receiving and transmitting electromagnetic signals generally in the radio frequency bands, multi-antenna assemblies that include satellite navigation and radio frequency band antennas, and UV resistance treated Polymethylpentene housings and associated antennas.

In one aspect, the present disclosure includes antennas, generally used for receiving and/or transmitting electromagnetic signals in the radio frequency spectrum, which may further be used in multi-antenna assemblies or other assemblies requiring wiring to travel across, though, or nearby the antenna. The antenna may include a shielding element and a ground plane position parallel to one another. An array of conductive mast elements configured to receive signals and driven by electrical current to transmit signals may be positioned between the shielding and ground plane elements. A conductive and hollow tubular passage may also be positioned between and provide a passageway through the shielding and ground plane elements such that wiring may pass through the antenna. In the antenna, the array of mast elements and the tubular passage may be positioned relative to one another between the shielding element and ground plane element such that when the electrical current is supplied to drive the mast elements in transmitting signals, the radiation of signals from the driven mast elements in combination with that radiating off the non-driven tubular passage may have a substantially omnidirectional azimuthal radiation pattern.

In another aspect, transmission lines having different lengths and/or different impedances may be used to drive current to mast elements or other conductive antenna elements used in broadcasting signals. The lengths/impedances of transmission lines may be selected to control the radiation pattern of antennas in keeping with the present disclosure which may be substantially omnidirectional azimuthally.

In another aspect, the antenna may include one or more filters for filtering to remove out of band energy from GNSS or other signal generating elements of the device in which the antenna is included. Likewise, the antenna may be detuned at the specified frequencies of a GNSS or other signal generating elements of the device in which the antenna is included. For instance, the antenna may purposely be altered to minimize performance at those frequencies of the out of band energy.

In another aspect, the antenna may be configured for receiving and/or transmitting Bluetooth, Bluetooth low energy (BLE), Wi-Fi or other wireless local area network (WLAN), cellular or other frequency bands in the radio spectrum.

In another aspect, the present disclosure may include a multi-antenna apparatus. The multi-antenna apparatus may include a housing enclosing a GNSS antenna element positioned on top of a radio antenna of the present invention. The radio antenna may be of the variety or share aspects with the other antennas of the present disclosure. For instance, the radio antenna may include a shielding element and a ground plane wherein the ground plane may substantially match the horizontal cross-section dimensions of the GNSS antenna and wherein each element is position parallel to one another. The shielding and ground plane elements may direct the radiation so as to not cross-couple with the GNSS signals to the extent possible. An array of conductive mast elements configured to receive radio signals and driven by electrical current to transmit radio signals may be positioned between the shielding and ground plane elements. A conductive and hollow tubular passage may also be positioned between and provide a passageway through the shielding and ground plane elements such that wiring may pass through the radio antenna for the portioning of power and data signals from the GNSS antenna, through the radio antenna, and further to a receiver. In the radio antenna, the array of mast elements and the tubular passage may be positioned relative to one another between the shielding element and ground plane element such that when the electrical current is supplied to drive the mast elements in transmitting radio signals, the radiation of radio signals from the driven mast elements in combination with that radiating off the non-driven tubular passage may have a substantially omnidirectional azimuthal radiation pattern. Likewise, different lengths/impedances of transmission lines may be used in transmitting current to antennas in controlling the radiation pattern of broadcasted signals which may be substantially omnidirectional azimuthally.

In another aspect, radio antenna of the multi-antenna apparatus may include one or more filters for filtering to remove out of band energy from GNSS antenna. Likewise, the radio antenna may be detuned at the specified frequencies of the GNSS signals. For instance, the antenna may purposely be altered to minimize performance at those frequencies of the out of band energy.

In another aspect, the radio antenna of the multi-antenna apparatus may be configured for Bluetooth, Bluetooth low energy (BLE), Wi-Fi or other wireless local area network (WLAN), cellular, or other frequency bands in the radio spectrum.

In another aspect, the multi-antenna apparatus of the present disclosure may be used in a utility locator device or devices of a utility locating system. In some embodiments, the multi-antenna apparatus may be used in a mesh network with other multi-antenna apparatus.

In another aspect, the present disclosure may include an antenna having a housing that is or includes a UV resistance treated Polymethylpentene substrate and one or more conductive antenna elements. The UV resistance treatment may add protection to the Polymethylpentene substrate or other housing against UV light exposure that would otherwise cause damage to the Polymethylpentene material. In some embodiments, the antenna element(s) may be formed in or on the Polymethylpentene substrate by selective plating one or more conductive circuit patterns. In other embodiments, the antenna element may be a conventional antenna seated in a UV resistance treated Polymethylpentene housing. In some embodiments, the Polymethylpentene may be TPX material commercially available from Mitsui Chemical, Inc. further treated to resist damage from UV exposure. In some embodiments, the antenna may be employed in a drone or other unmanned aerial vehicle.

Example Radio Antenna, Multi-Antenna Apparatus, and Antenna Housing Embodiments It is noted that as used herein, the term, "exemplary" means "serving as an example, instance, or illustration." Any aspect, detail, function, implementation, and/or embodiment described herein as "exemplary" is not necessarily to be construed as preferred or advantageous over other aspects and/or embodiments.

Figure 1B:
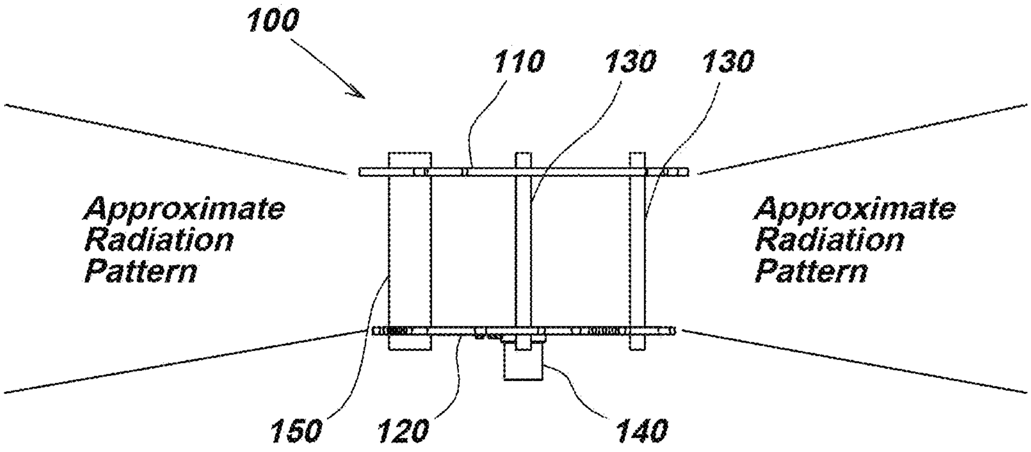
FIG. 1B is a side view illustrating the approximate radiation pattern of radio signals from the antenna of FIG. 1A.
Figure 1C:
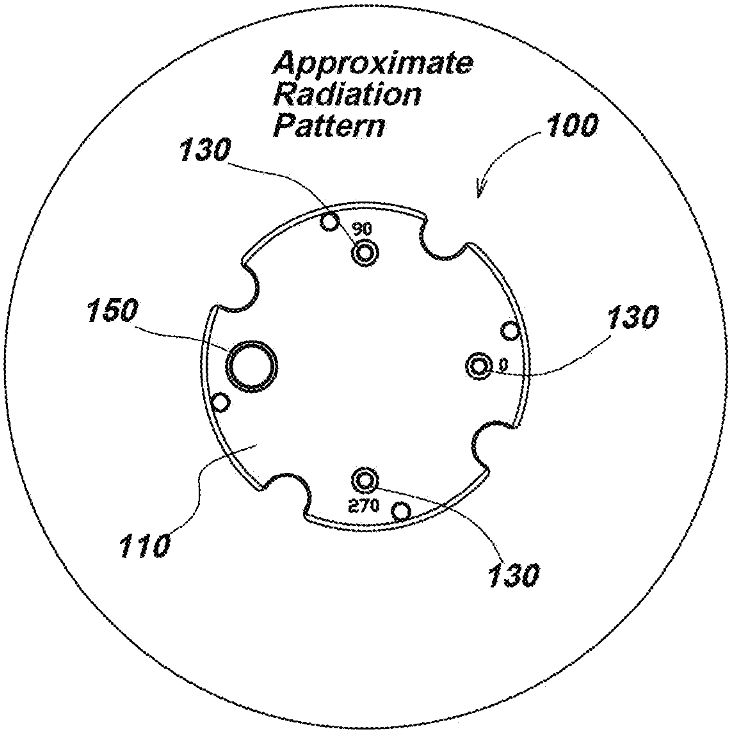
FIG. 1C is a top view illustrating the substantially omnidirectional azimuthal radiation pattern of radio signals from the antenna of FIG. 1A.

Referring to FIGS. 1A-1C, an antenna embodiment 100 in accordance with aspects of the present disclosure is illustrated which may generally be tuned for use in the radio band spectrum. The antenna 100 may include a shielding element 110 and a ground plane element 120 positioned parallel to one another. An array of conductive mast elements 130 may be positioned between the shielding element 110 and ground plane element 120. The mast elements 130 may be configured to receive radio signals and when driven by electrical current to transmit radio signals. A receiver/transmitter for driving electrical current to the mast elements 130 may couple to the antenna 100 via a port 140. The mast elements 130 and overall antenna 100 may, for example, receive and/or transmit on Wi-Fi or other WLAN bands, Bluetooth, Bluetooth Low Energy (BLE), and/or other radio bands. In addition to mast elements 130, the antenna 100 may include a conductive and hollow tubular passage 150 positioned between and providing an opening through the shielding element 110 and ground plane element 120 such that wiring may pass through antenna 100 via passage 150. It should be noted that the signal carried onto the wiring (e.g., wiring 270 of FIG. 2) passing through the passage 150 may be minimized. For instance, the wiring (e.g., wiring 270 of FIG. 2) may be jacketed to minimize carried signal coupling on passage 150.

As shown in FIG. 1A, wiring assembly (e.g., wiring 270 of FIG. 2) may pass through antenna 100 via passage 150. In some embodiments, wiring may pass through antenna 100 via passage 150 to connect another antenna (e.g., GNSS antenna 440 of FIG. 4) to a receiver/transmitter. In other embodiments, wiring may pass through antenna 100 via passage 150 to connect other powered/data communicating elements of a device disposed on either side of the antenna 100.

As further shown in FIGS. 1B and 1C, the mast elements 130 and the tubular passage 150 may be positioned relative to one another such that when electrical current is supplied to drive the mast elements 130 in transmitting radio signals, the radiation of radio signals from the driven mast elements in combination with radiating off the non-driven passage 150 will have a substantially omnidirectional azimuthal radiation pattern (best illustrated in FIG. 1C). It should be noted that other radio antenna embodiments in keeping with the present may include other numbers of mast elements and/or numbers of conductive passages wherein the geometry of the mast element(s) and conductive passage(s) may broadcast a substantially omnidirectional azimuthal radiation pattern. It should be noted, that the substantially omnidirectional azimuthal radiation pattern may be controlled by a multitude of transmission lines having different lengths and different impedances.

Figure 1D:
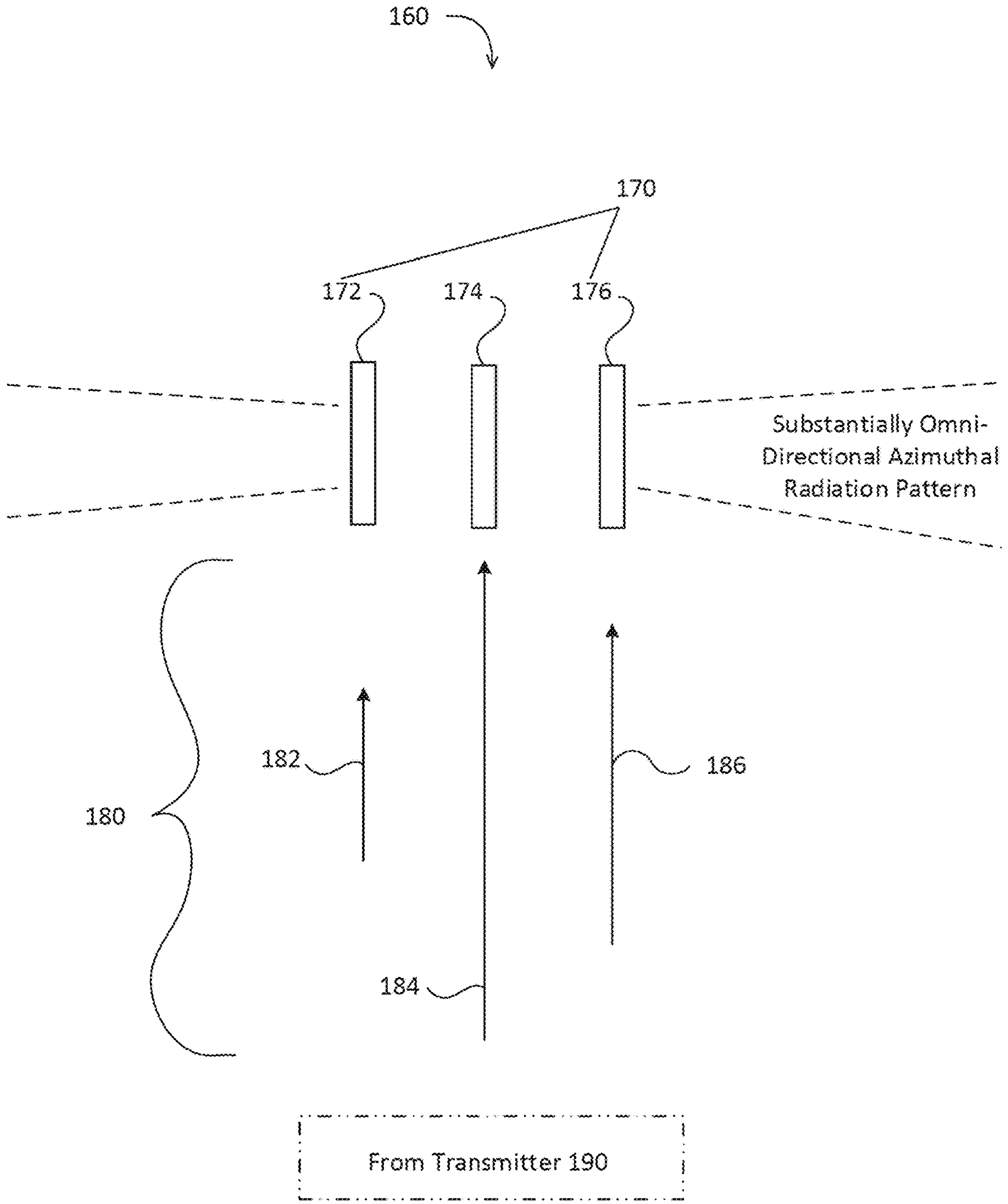
FIG. 1D is a diagram showing multiple transmission lines of different length and impedance to control radiation pattern.

As illustrated in FIG. 1D, an antenna embodiment 160 in in accordance with aspects of the present disclosure is illustrated having an array of conductive antenna elements for transmitting and/or receiving electromagnetic signals that may generally be in the radio frequency spectrum. The antenna 160 may have a mast array 170 further having a plurality of individual masts 172, 174, and 176. The mast array 170 may be driven by current from a transmitter 190, or transceiver in some embodiments, via an array of transmission lines 180 having a number of different transmission lines 182, 184, and 186 of different lengths and different impedances. The lengths and impedances of the transmission lines 182, 184, and 186 may be selected to control the radiation pattern from the geometry of the mast array 170. In various embodiments herein, the radiation pattern may be a substantially azimuthally omnidirectional radiation pattern. Some embodiments may further include a non-driven conductive element, such as the passage 150 of FIGS. 1A-1C that may contribute to the overall radiation pattern.

Figure 2:
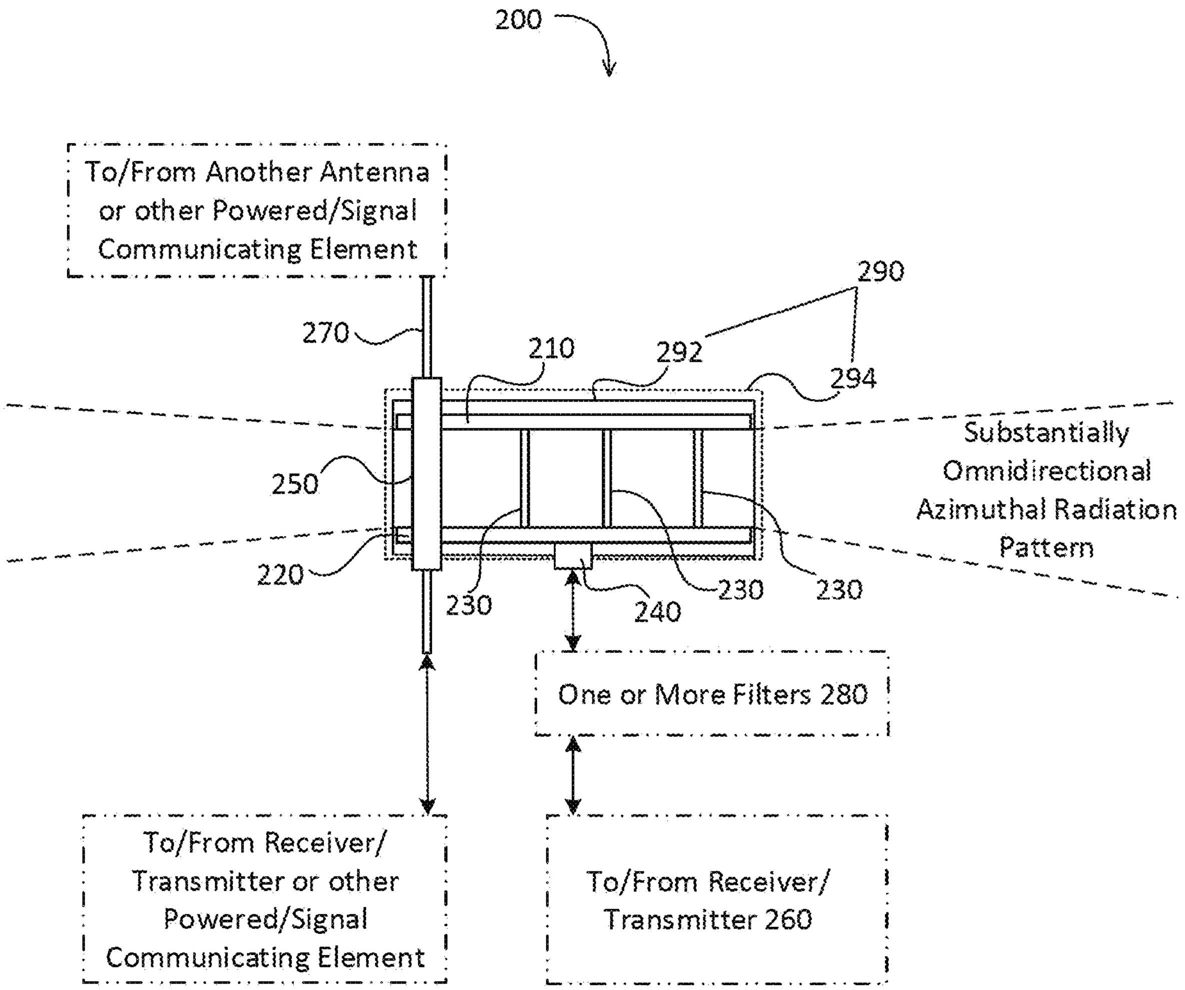
FIG. 2 is a diagram of a radio antenna in keeping with the present disclosure.

Turning to FIG. 2, a diagram of a radio antenna embodiment 200 in in accordance with aspects of the present disclosure is diagrammed. This embodiment may be or share aspects with the antenna embodiment 100 of FIGS. 1A-1C. The antenna 200 may include a shielding element 210 and a ground plane element 220 positioned parallel to one another. An array of conductive mast elements 230 may be positioned between the shielding element 210 and ground plane element 220. The mast elements 230 may be configured to receive radio signals and, when driven by electrical current, transmit radio signals. A receiver/transmitter 260 for driving electrical current to the mast elements 230 may couple to the antenna 200 via a port 240. The mast elements 230 and overall antenna 200 may, for example, receive and/or transmit on Wi-Fi or other WLAN bands, Bluetooth, Bluetooth Low Energy (BLE), and/or other radio bands. In addition to mast elements 230 the antenna 200 may include a conductive and hollow tubular passage 250 positioned between and providing a passageway through the shielding element 210 and ground plane element 220 such that wiring 270 may pass through antenna 200 via the passage 250. In some embodiments, the wiring 270 may pass through to connect another antenna (e.g., GNSS antenna 440 of FIG. 4) on one side of the antenna 200 and to a receiver/transmitter on the other side on the antenna 200. In other embodiments, the wiring 270 may connect other powered or data communicating elements of a device disposed on either side of the antenna 200. It should be noted that the signal carried onto the wiring 270 made to pass through the passage 250 may be minimized on passage 250. For instance, the wiring 270 may be jacketed to minimize signal carried on wire 270 from coupling onto the passage 250.

Still referring to FIG. 2, one or more filters 280 may be included to filter remove out of band energy. For instance, the antenna 200 may further couple a GNSS antenna (e.g., GNSS antenna 440 of FIG. 4) or other antenna or other powered or signal communicating element producing signals out of band to the antenna 200. In some embodiments, the antenna 200 may specifically be detuned at the specific out of band frequencies of an attached GNSS antenna (e.g., GNSS antenna 440 of FIG. 4) or other antenna or other powered or signal communicating element. For instance, the antenna 200 may purposely be altered to minimize performance at the out of band frequencies of the out of band energy of an attached GNSS antenna (e.g., GNSS antenna 440 of FIG. 4) or other antenna(s) or other powered or signal communicating element(s).

It should also be noted that a housing such as embodiment 290 may encapsulate the antenna 200. The housing 290, in some embodiments may be or include a Polymethylpentene substrate 292. As Polymethylpentene degrades in UV light, this material has traditionally been used in applications avoiding usage in sunlight. Despite the traditional uses for Polymethylpentene, the dielectric properties of Polymethylpentene may otherwise be ideal for antenna housings. The Polymethylpentene substrate 292 of housing 290, and other Polymethylpentene elements of antenna housings of the present disclosure, may be modified by modifying the Polymethylpentene with a UV treatment 294 that maintains the superior dielectric properties while providing UV light protection. In some embodiments, the Polymethylpentene material may be TPX material commercially available from Mitsui Chemical, Inc. that is further treated for UV light exposure. Likewise, antenna housings made of or including UV resistance treated Polymethylpentene may have mechanical properties otherwise suitable for protecting against impact or other external damage. Further, UV resistance treated Polymethylpentene, being a lightweight material, may be ideal for low weight applications (e.g., drone 810 of FIG. 8).

Turning to FIGS. 3A-3D, a multi-antenna apparatus embodiment 300 is illustrated in in accordance with aspects of the present disclosure. The multi-antenna apparatus 300 may include an external housing embodiment 310 encapsulating a global navigation satellite system (GNSS) antenna (e.g., GNSS antenna 440 of FIG. 4) and a radio antenna (e.g., radio antenna 450 of FIG. 4). In some embodiments, the housing may be made of or include UV resistance treated Polymethylpentene which may be UV resistance treated TPX material commercially available from Mitsui Chemical, Inc.

Figure 3A:
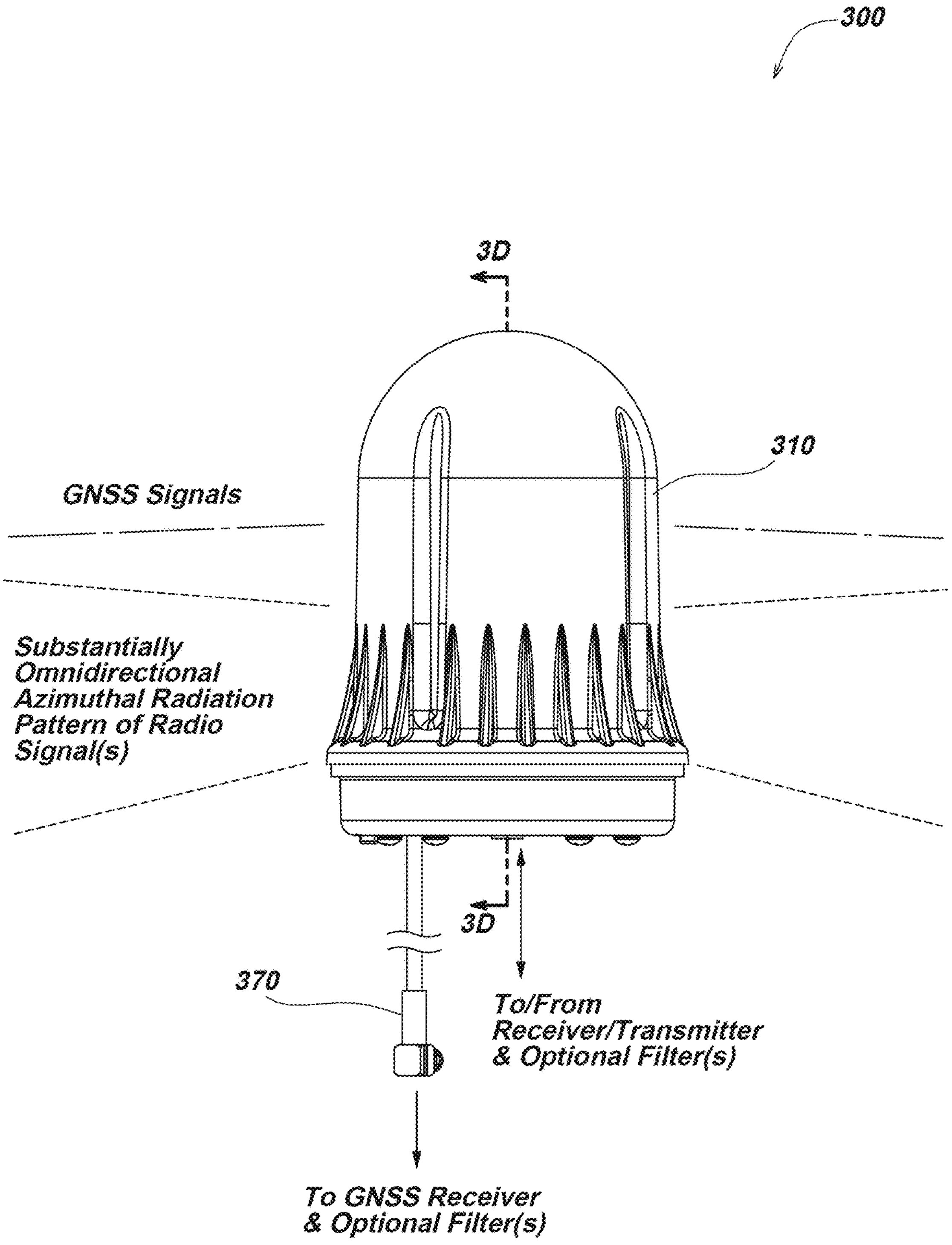
FIG. 3A is an isometric view of a multi-antenna apparatus in keeping with the present disclosure.
Figure 3B:
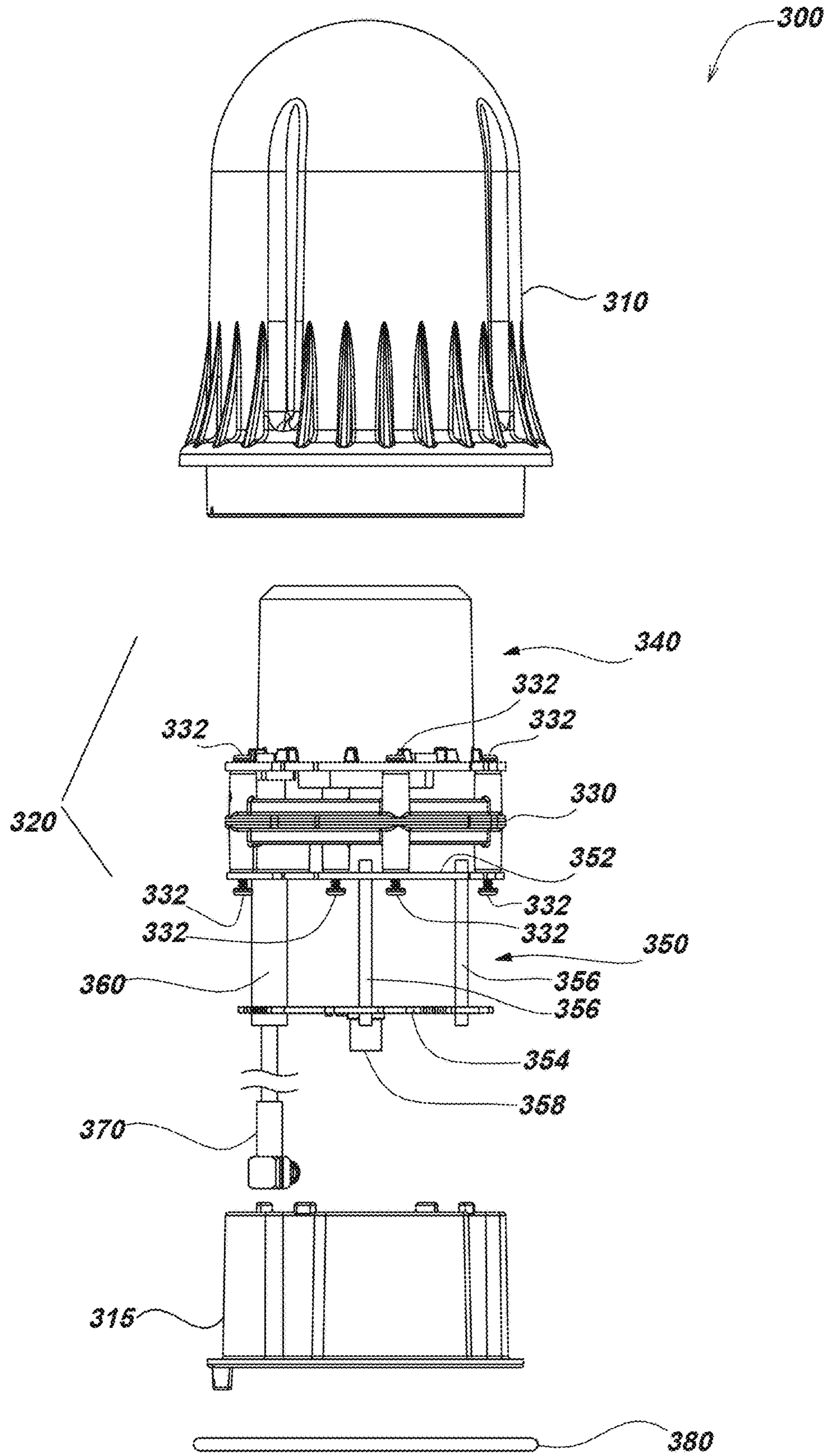
FIG. 3B is a partially exploded view of the multi-antenna apparatus from FIG. 3A.
Figure 3C:
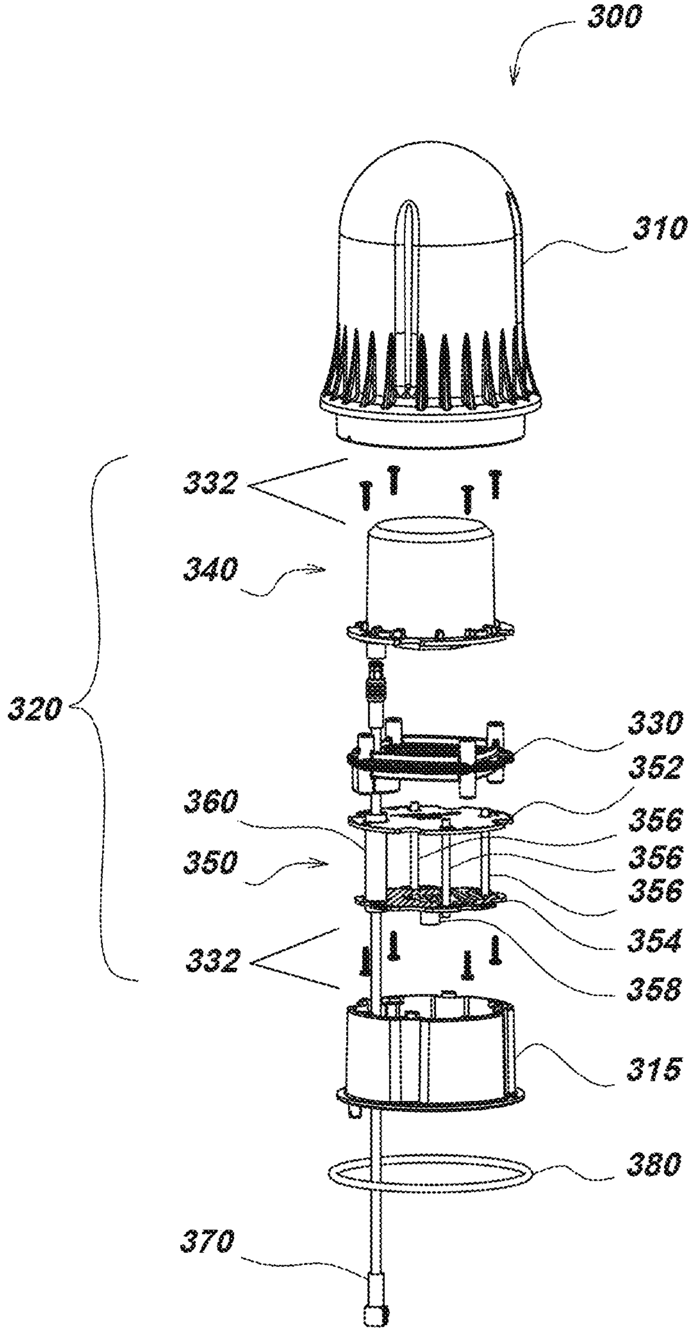
FIG. 3C is an exploded view of the multi-antenna apparatus from FIG. 3A.
Figure 3D:
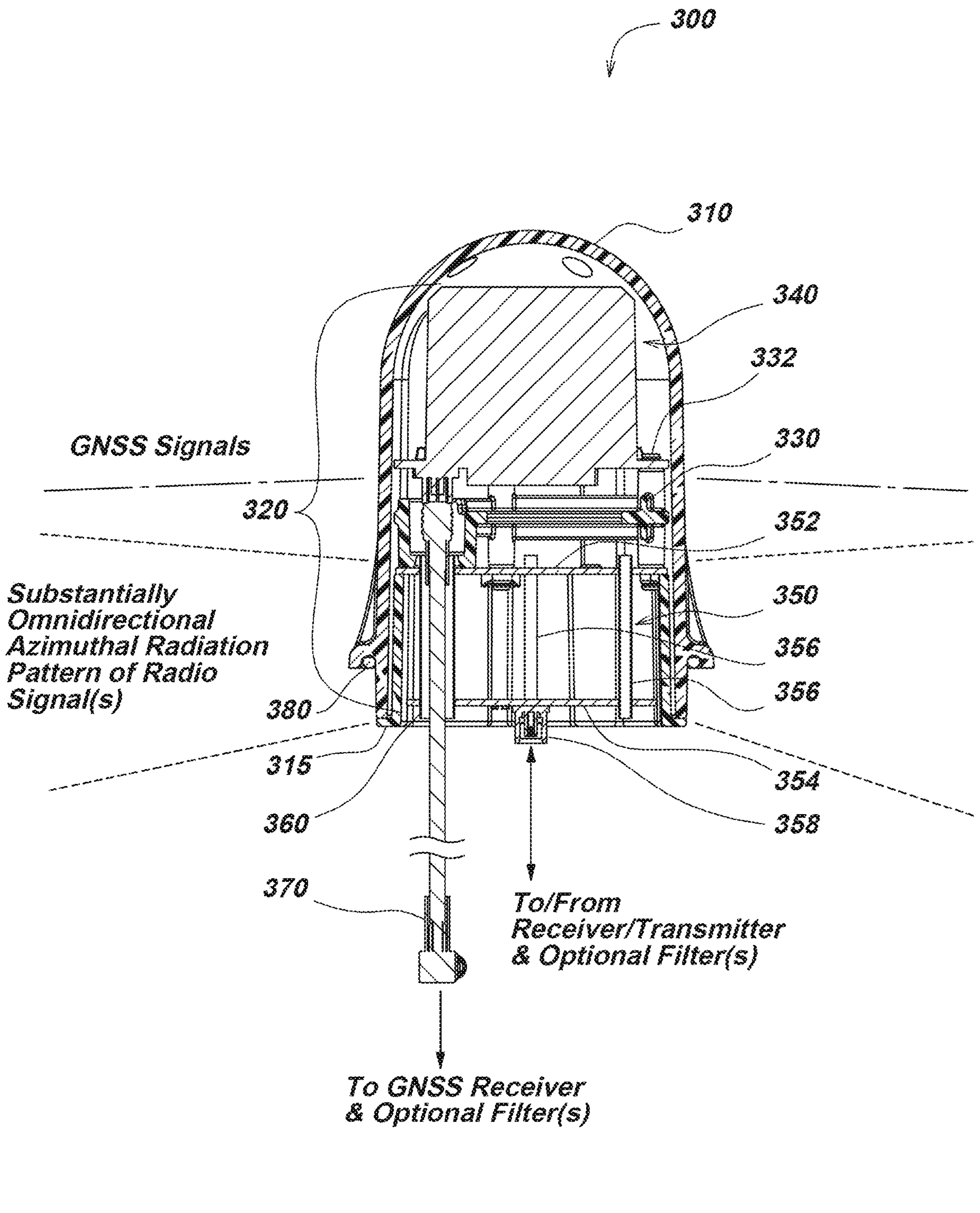
FIG. 3D is a section view of the multi-antenna apparatus along line 3D-3D from FIG. 3A.

Turning to FIGS. 3B-3D, a sleeve 315 may mate into the bottom of the housing 310 securing an antenna assembly 320 in between. In some embodiments, the sleeve 315 may be made of or include low loss TPX material commercially available from Mitsui Chemical, Inc. or other low loss Polymethylpentene. The antenna assembly 320 may include a spacer element 330 that may, via screws 332, couple a GNSS antenna 340 on the top of the spacer element 330 and a radio antenna 350 on the bottom of the spacer element 330.

Still referring to FIGS. 3B-3D, it should be noted that during exemplary usage, the multi-antenna apparatus 300 may be oriented with the GNSS antenna 340 directed up toward the sky and thereby toward navigation satellites. In some embodiments, the GNSS antenna 340 may be configured for a frequency range spanning the lower L-band and upper L-band GNSS navigational frequencies which includes the L1, L2, and L5 GNSS navigational frequencies.

The GNSS antenna 340 may be or include aspects of the various antennas disclosed in U.S. patent application Ser. No. 16/642,009, filed Oct. 11, 2017, entitled QUADRIFILAR HELICAL ANTENNA, U.S. patent application Ser. No. 16/622,047, filed Jul. 20, 2018, entitled ANTENNA MOUNTING BASE AND ANTENNA, U.S. Pat. No. 10,483,633, issued Nov. 19, 2019, entitled MULTIFUNCTIONAL GNSS ANTENNA, and U.S. Pat. No. 10,700,430, issued Jun. 30, 2020, entitled PARASITIC MULTIFILAR MULTIBAND ANTENNA, U.S. Pat. No. 11,050,131, issued Jun. 29, 2021, entitled ANTENNA MOUNTING BASE AND ANTENNA, the contents of which are incorporated by reference herein in their entirety.

Likewise, the GNSS antenna 324 may be or include aspects of the various antennas disclosed in U.S. patent application Ser. No. 17/020,487, filed Sep. 14, 2020, entitled ANTENNA SYSTEMS FOR CIRCULARLY POLARIZED RADIO SIGNALS the content of which is incorporated by reference herein in its entirety.

In some embodiments, the GNSS antenna 340 may be a commercially available antenna for receiving GPS, Galileo, GLONASS, BeiDou, and/or other satellite navigation system signals. The GNSS antenna 340 may connect, vi wiring 370 made to pass through the radio antenna 350 via passage 360, to one or more optional filters and a GNSS receiver (e.g., the one or more filters 480 and GNSS receiver 485 of FIG. 4).

Still referring to FIGS. 3B-3C, the radio antenna embodiment 350 may be or share aspects with the antenna 100 of FIGS. 1A-1C or antenna 200 of FIG. 2. The radio antenna 350 may include a shielding element 352 and a ground plane element 354 positioned parallel to one another. An array of conductive mast elements 356 may be positioned between the shielding element 352 and ground plane element 354. The mast elements 356 may be configured to receive radio signals and when driven by electrical current to transmit radio signals. A receiver/transmitter for driving electrical current to the mast elements 356 may couple to the radio antenna 350 via a port 358. The mast elements 356 and overall radio antenna 350 may, for example, receive and/or transmit on Wi-Fi or other WLAN bands, Bluetooth, Bluetooth Low Energy (BLE), and/or other frequency bands in the radio spectrum. In addition to mast elements 356, the radio antenna 350 may include a conductive and hollow tubular passage 360 positioned between and providing a passageway through the shielding element 352 and ground plane element 354 such that wiring, such as wiring 370 may pass through the radio antenna 350 via passage 360 to the GNSS antenna 340.

The mast elements 356 and the tubular passage 360 may be positioned relative to one another such that when electrical current is supplied to drive the mast elements 356 in transmitting radio signals, as best illustrated in FIG. 3D, the radiation of radio signals from the driven mast elements 356 in combination with radiating off the non-driven tubular passage 360 will have a substantially omnidirectional azimuthal radiation pattern (e.g., the radiation pattern illustrated in FIG. 1C). It should be noted that other radio antenna embodiments in keeping with the present disclosure may include other numbers of mast elements and/or numbers of conductive passages wherein the geometry of the mast element(s) and conductive passage(s) may broadcast a substantially omnidirectional azimuthal radiation pattern. A multitude of transmission lines, such as the transmission lines 182, 184, and 186 of FIG. 1D, may be included in antenna 300 for providing current from a transmitter or other transceiver to the mast elements 356. The lengths and impedances of transmission lines (e.g., transmission lines 182, 184, and 186 of FIG. 1D) may be chosen to control the substantially omnidirectional azimuthal radiation pattern (FIGS. 3A and 3D).

As shown in FIG. 3D, an exemplary radiation pattern of the radio antenna 350 may steer a transmitted signal in such a way as to prevent coupling back at the GNSS antenna 340. Likewise, the GNSS signals may not cross-couple or have minimal cross-coupling at the radio antenna 350 within a desired frequency range or ranges. In such embodiments, filtering of out of band energy may occur for each antenna 340 and 350. Likewise, antennas 340 and 350 may be detuned at the specific out of band frequencies of the other. For instance, the radio antenna 350 may be detuned at the frequencies of the GNSS antenna 340 and the GNSS antenna 340 may be detuned at the frequencies of the radio antenna 350. For instance, the radio antenna 350 may purposely be altered to minimize performance at the out of band frequencies of the out of band energy of the GNSS antenna 340.

As shown in FIGS. 3B-3D, an O-ring 380 may be positioned between the antenna 300 and a device in which antenna 300 may be installed. The O-ring 380 may seal against the ingress of water, dirt, or other corrosive or damaging elements which may otherwise enter the housing 310 of the antenna 300.

Figure 4:
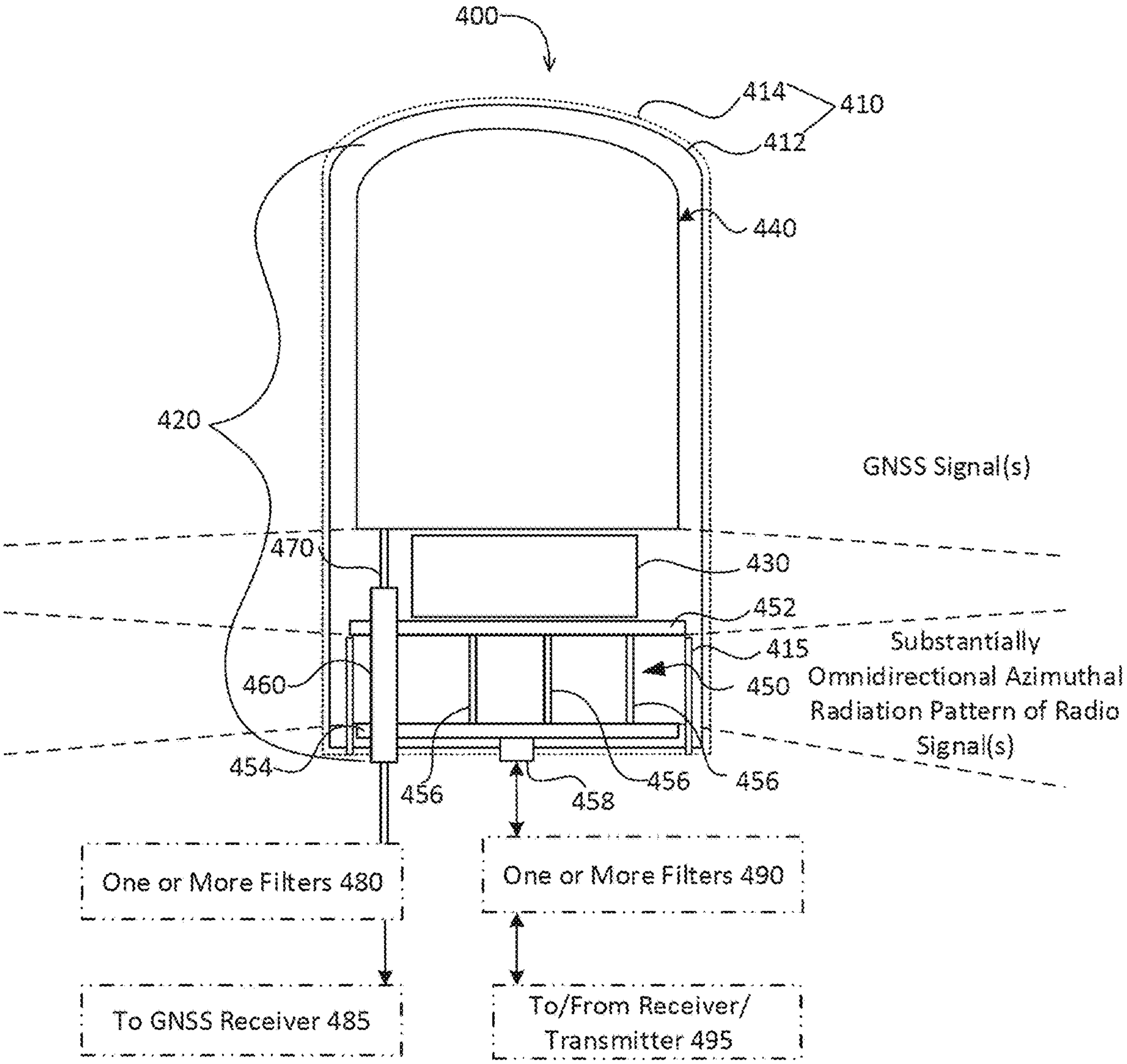
FIG. 4 is a diagram of a multi-antenna apparatus in keeping with the present disclosure.

Turning to FIG. 4, a multi-antenna apparatus embodiment 400 is illustrated which may be or share aspects with the multi-antenna apparatus embodiment 300 of FIGS. 3A-3D. The multi-antenna apparatus 400 may include an external housing 410 encapsulating a global navigation satellite system (GNSS) antenna 440 and a radio antenna 450. In some embodiments, the housing may be made of or include Polymethylpentene substrate 412 having a UV treatment 414 applied thereto. In some embodiments, the Polymethylpentene substrate 412 may be TPX material commercially available from Mitsui Chemical, Inc. that may further include a UV treatment 414.

Still referring to FIG. 4, a sleeve 415 may mate into the bottom of the housing 410 securing an antenna assembly 420 in between. The antenna assembly 420 may include a spacer element 430 that may couple the GNSS antenna 440 on the top of the spacer element 430 and a radio antenna 450 on the bottom of the spacer element 430.

Still referring to FIG. 4, it should be noted that in an exemplary usage, the multi-antenna apparatus 400 may be oriented with the GNSS antenna 440 directed up toward the sky and thereby toward navigation satellites. In some embodiments, the GNSS antenna 440 may be configured for a frequency range spanning the lower L-band and upper L-band GNSS navigational frequencies which includes the L1, L2, and L5 GNSS navigational frequencies.

The GNSS antenna 440 may be or include aspects of the various antennas disclosed in U.S. patent application Ser. No. 16/070,982, filed Oct. 11, 2017, entitled MULTIFUNCTIONAL GNSS ANTENNA, U.S. patent application Ser. No. 16/642,009, filed Oct. 11, 2017, entitled QUADRIFILAR HELICAL ANTENNA, U.S. patent application Ser. No. 15/831,335, filed Dec. 4, 2017, entitled PARASITIC MULTIFILAR MULTIBAND ANTENNA, U.S. patent application Ser. No. 16/622,047, filed Jul. 20, 2018, entitled ANTENNA MOUNTING BASE AND ANTENNA, U.S. Pat. No. 10,483,633, issued Nov. 19, 2019, entitled MULTIFUNCTIONAL GNSS ANTENNA, and U.S. Pat. No. 10,700,430, issued Jun. 30, 2020, entitled PARASITIC MULTIFILAR MULTIBAND ANTENNA, U.S. Pat. No. 11,050,131, issued Jun. 29, 2021, entitled ANTENNA MOUNTING BASE AND ANTENNA the contents of which are incorporated by reference herein in their entirety.

Likewise, the GNSS antenna 440 may be or include aspects of the various antennas disclosed in U.S. Provisional Patent Application No. 62/899,296, filed Sep. 12, 2019, entitled ANTENNA SYSTEMS FOR CIRCULARLY POLARIZED RADIO SIGNALS and U.S. patent application Ser. No. 17/020,487, filed Sep. 14, 2020, entitled ANTENNA SYSTEMS FOR CIRCULARLY POLARIZED RADIO SIGNALS. The content of each of the above-described patents and applications is incorporated by reference herein in its entirety.

In some embodiments, the GNSS antenna 440 may be a commercially available antenna for receiving GPS, Galileo, GLONASS, BeiDou, and/or other satellite navigation system signals. The GNSS antenna 440 may connect, via wiring 470 made to pass through the radio antenna 450, to one or more optional filters 480 and further to a GNSS receiver 485. The one or more filters 480 may include filters for filtering out of band energy from the radio antenna 450. Likewise, the GNSS antenna 440 may be detuned at the specific out of band frequencies of the radio antenna 450. For instance, the GNSS antenna 440 may purposely be altered to minimize performance at the out of band frequencies of the out of band energy of the radio antenna 450.

Still referring to FIG. 4, the radio antenna embodiment 450 may be or share aspects with the antenna 100 of FIGS. 1A-1C, antenna 200 of FIG. 2, or radio antenna 350 of FIGS. 3B-3D. The radio antenna 450 may include a shielding element 452 and a ground plane element 454 positioned parallel to one another. An array of conductive mast elements 456 may be positioned between the shielding element 452 and ground plane element 454. The mast elements 456 may be configured to receive radio signals and when driven by electrical current to transmit radio signals.

A receiver/transmitter 495 for driving electrical current to the mast elements 456 may couple to the radio antenna 450 via a port 458. The mast elements 456 and overall radio antenna 450 may, for example, receive and/or transmit on Wi-Fi or other WLAN bands, Bluetooth, Bluetooth Low Energy (BLE), and/or other radio bands. In addition to mast elements 456, the radio antenna 450 may include a conductive and hollow tubular passage 460 positioned between and providing a passageway through the shielding element 452 and ground plane element 454 such that wiring 470 may pass through the radio antenna 450 via passage 460 to the GNSS antenna 440. It should be noted that the signal carried onto the wiring 470 made to pass through the passage 460 may be minimized on the passage 460. For instance, the wiring 470 may be jacketed to minimize signal from coupling onto the passage 460.

The mast elements 456 and the tubular passage 460 may be positioned relative to one another such that when electrical current is supplied to drive the mast elements 456 by a transmitter such as that present in a receiver/transmitter 495 to generate and broadcast radio signals the radiation of radio signals from the driven mast elements 456 in combination with radiating off the non-driven tubular passage 460 will have a substantially omnidirectional azimuthal radiation pattern (e.g., the radiation pattern of illustrated in FIG. 1C).

It should be noted that other radio antenna embodiments in accordance with aspects of the present disclosure may include other numbers of mast elements and/or numbers of conductive passages wherein the geometry of the mast element(s) and conductive passage(s) may broadcast a substantially omnidirectional azimuthal radiation pattern. A plurality of transmission lines, such as the transmission lines 182, 184, and 186 of FIG. 1D, may be included in antenna 400 for providing current from the receiver/transmitter 495 to the mast elements 456. The lengths and impedances of transmission lines (e.g., transmission lines 182, 184, and 186 of FIG. 1D) may be chosen to control the substantially omnidirectional azimuthal radiation pattern.

Likewise, the shielding element 452 and ground plane element 454 may steer the radiation pattern of the radio antenna 450 in such a way to prevent coupling back at the GNSS antenna 440. Likewise, such geometry of the shielding element 452 and ground plane element 454 may prevent the GNSS signals from cross-coupling back at the radio antenna 450. Out of band energy may optionally be filtered from the GNSS antenna 440 via one or more filters 490. Likewise the radio antenna 450 may be detuned at the specific out of band frequencies of the GNSS antenna 440. For instance, the radio antenna 450 may purposely be altered to minimize performance at the out of band frequencies of the out of band energy of the GNSS antenna 440.

Figure 5:
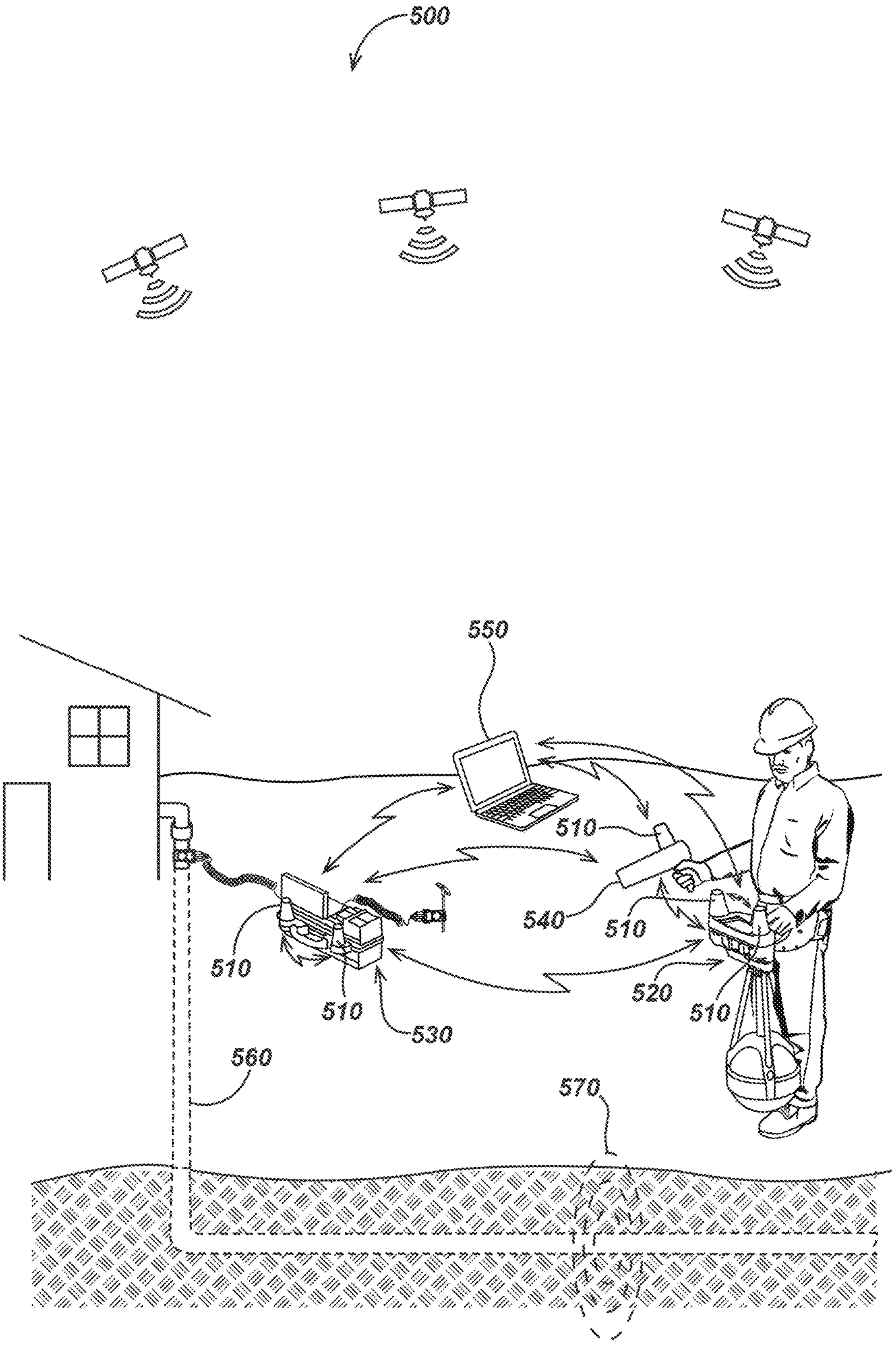
FIG. 5 is an illustration demonstrating a plurality of multi-antenna apparatus used in various utility locating system devices in keeping with the present disclosure.

Turning to FIG. 5, a utility locating system embodiment 500 is illustrated, comprising a variety of devices such that the devices may each have one or more multi-antenna apparatus 510. The multi-antenna apparatus 510 may be or share aspects with the antenna apparatus disclosed herein, such as the multi-antenna apparatus 300 of FIGS. 3A-3C or the multi-antenna apparatus 400 of FIG. 4.

In FIG. 5, the utility locating system 500 may include, but is not limited to, a utility locator device 520 for detecting magnetic field signal emitted from a buried utility or other conductor, a transmitter device 530 for generating current signals for coupling to a buried utility or other conductor, a range finding device 540 for determining a distance to a target, and a laptop computer or tablet device or other computing device 550. The utility locator device 520, transmitter device 530, and range finding device 540 may each have one or more multi-antenna apparatus 510. The laptop 550 may further be configured with other antenna and associated transmitter/receiver to communicate with other utility locating system 500 devices.

The utility locating system and various devices therein may be those or share aspects with Applicant's various co-assigned patents and patent publications, including those disclosed in U.S. Pat. No. 5,939,679, issued Aug. 17, 1999, entitled VIDEO PUSH CABLE; U.S. Pat. No. 6,545,704, issued Apr. 8, 2003, entitled VIDEO PIPE INSPECTION DISTANCE MEASURING SYSTEM; U.S. Pat. No. 6,697,102, issued Feb. 24, 2004, entitled BORE HOLE CAMERA WITH IMPROVED FORWARD AND SIDE VIEW ILLUMINATION; U.S. Pat. No. 6,831,679, issued Dec. 14, 2004, entitled VIDEO CAMERA HEAD WITH THERMAL FEEDBACK LIGHTING CONTROL; U.S. Pat. No. 6,862,945, issued Mar. 8, 2005, entitled CAMERA GUIDE FOR VIDEO PIPE INSPECTION SYSTEM; U.S. Pat. No. 6,908,310, issued Jun. 21, 2005, entitled SLIP RING ASSEMBLY WITH INTEGRAL POSITION ENCODER; U.S. Pat. No. 6,958,767, issued Oct. 25, 2005, entitled VIDEO PIPE INSPECTION SYSTEM EMPLOYING NON-ROTATING CABLE STORAGE DRUM; U.S. Pat. No. 7,009,399, issued Mar. 7, 2006, entitled OMNIDIRECTIONAL SONDE AND LINE LOCATOR; U.S. Pat. No. 7,221,136, issued May 22, 2007, entitled SONDES FOR LOCATING UNDERGROUND PIPES AND CONDUITS; U.S. Pat. No. 7,276,910, issued Oct. 2, 2007, entitled A COMPACT SELF-TUNED ELECTRICAL RESONATOR FOR BURIED OBJECT LOCATOR APPLICATIONS; U.S. Pat. No. 7,288,929, issued Oct. 30, 2007, entitled INDUCTIVE CLAMP FOR APPLYING SIGNAL TO BURIED UTILITIES; U.S. Pat. No. 7,332,901, issued Feb. 19, 2008, entitled LOCATOR WITH APPARENT DEPTH INDICATION; U.S. Pat. No. 7,443,154, issued Oct. 28, 2008, entitled MULTI-SENSOR MAPPING OMNIDIRECTIONAL SONDE AND LINE LOCATOR; U.S. Pat. No. 7,336,078, issued Feb. 26, 2008, entitled MULTI-SENSOR MAPPING OMNIDIRECTIONAL SONDE AND LINE LOCATORS; U.S. Pat. No. 7,557,559, issued Jul. 7, 2009, entitled COMPACT LINE ILLUMINATOR FOR BURIED PIPES AND CABLES; U.S. Pat. No. 7,741,848, issued Jun. 22, 2010, entitled ADAPTIVE MULTICHANNEL LOCATOR SYSTEM FOR MULTIPLE PROXIMITY DETECTION; U.S. Pat. No. 7,864,980, issued Jan. 4, 2011, entitled SONDES FOR LOCATING UNDERGROUND PIPES AND CONDUITS; U.S. Pat. No. 8,013,610, issued Sep. 6, 2011, entitled HIGH Q SELF-TUNING LOCATING TRANSMITTER; U.S. Pat. No. 8,289,385, issued Oct. 16, 2012, entitled PUSH-CABLE FOR PIPE INSPECTION SYSTEM; U.S. Pat. No. 8,264,226, issued Sep. 11, 2012, entitled SYSTEM AND METHOD FOR LOCATING BURIED PIPES AND CABLES WITH A MAN PORTABLE LOCATOR AND A TRANSMITTER IN A MESH NETWORK; U.S. patent application Ser. No. 13/769,202, filed Feb. 15, 2013, entitled SMART PAINT STICK DEVICES AND METHODS; U.S. Pat. No. 8,395,661, issued Mar. 12, 2013, entitled PIPE INSPECTION SYSTEM WITH SELECTIVE IMAGING CAPTURE; U.S. Pat. No. 8,400,154, issued Mar. 19, 2013, entitled LOCATOR ANTENNA WITH CONDUCTIVE BOBBIN; U.S. patent application Ser. No. 14/027,027, filed Sep. 13, 2013, entitled SONDE DEVICES INCLUDING A SECTIONAL FERRITE CORE STRUCTURE; U.S. Pat. No. 8,547,428, issued Oct. 1, 2013, entitled PIPE MAPPING SYSTEM; U.S. Pat. No. 8,587,648, issued Nov. 19, 2013, entitled SELF-LEVELING CAMERA HEAD; U.S. Pat. No. 8,908,027, issued Dec. 9, 2014, entitled ASYMMETRIC DRAG FORCE BEARING FOR USE WITH PUSH-CABLE STORAGE DRUM; U.S. Pat. No. 8,970,211, issued Mar. 3, 2015, entitled PIPE INSPECTION CABLE COUNTER AND OVERLAY MANAGEMENT SYSTEM; U.S. Pat. No. 9,057,754, issued Jun. 16, 2015, entitled ECONOMICAL MAGNETIC LOCATOR APPARATUS AND METHOD; U.S. Pat. No. 9,066,446, issued Jun. 23, 2015, entitled THERMAL EXTRACTION ARCHITECTURE FOR CAMERA HEADS, INSPECTION SYSTEMS, AND OTHER DEVICES AND SYSTEMS; U.S. Pat. No. 9,081,109, issued Jul. 14, 2015, entitled GROUND-TRACKING DEVICES FOR USE WITH A MAPPING LOCATOR; U.S. Pat. No. 9,082,269, issued Jul. 14, 2015, entitled HAPTIC DIRECTIONAL FEEDBACK HANDLES FOR LOCATION DEVICES; U.S. Pat. No. 9,080,992, issued Jul. 14, 2015, entitled ADJUSTABLE VARIABLE RESOLUTION INSPECTION SYSTEMS AND METHODS; U.S. Pat. No. 9,207,350, issued Dec. 8, 2015, entitled BURIED OBJECT LOCATOR APPARATUS WITH SAFETY LIGHTING ARRAY; U.S. Pat. No. 9,222,809, issued Dec. 29, 2015, entitled PORTABLE PIPE INSPECTION SYSTEMS AND APPARATUS; U.S. Pat. No. 9,341,740, issued May 17, 2016, entitled OPTICAL GROUND TRACKING APPARATUS, SYSTEMS, AND METHODS; U.S. Pat. No. 9,411,067, issued Aug. 9, 2016, entitled GROUND-TRACKING SYSTEMS AND APPARATUS; U.S. Pat. No. 9,435,907, issued Sep. 6, 2016, entitled PHASE SYNCHRONIZED BURIED OBJECT LOCATOR APPARATUS, SYSTEMS, AND METHODS; U.S. Pat. No. 9,448,376, issued Sep. 20, 2016, entitled HIGH BANDWIDTH PUSH-CABLES FOR VIDEO PIPE INSPECTION SYSTEMS; U.S. Pat. No. 9,465,129, issued Oct. 11, 2016, entitled IMAGE-BASED MAPPING LOCATING SYSTEM; U.S. Pat. No. 9,468,954, issued Oct. 18, 2016, entitled PIPE INSPECTION SYSTEM WITH JETTER PUSH-CABLE; U.S. Pat. No. 9,477,147, issued Oct. 25, 2016, entitled SPRING ASSEMBLIES WITH VARIABLE FLEXIBILITY FOR USE WITH PUSH-CABLES AND PIPE INSPECTION SYSTEMS; U.S. Pat. No. 9,521,303, issued Dec. 13, 2016, entitled CABLE STORAGE DRUM WITH MOVABLE CCU DOCKING APPARATUS; U.S. Pat. No. 9,523,788, issued Dec. 20, 2016, entitled MAGNETIC SENSING BURIED OBJECT LOCATOR INCLUDING A CAMERA; U.S. Pat. No. 9,571,326, issued Feb. 14, 2017, entitled METHOD AND APPARATUS FOR HIGH-SPEED DATA TRANSFER EMPLOYING SELF-SYNCHRONIZING QUADRATURE AMPLITUDE MODULATION (QAM); U.S. Pat. No. 9,599,449, issued Mar. 21, 2017, entitled SYSTEMS AND METHODS FOR LOCATING BURIED OR HIDDEN OBJECTS USING SHEET CURRENT FLOW MODELS; U.S. Pat. No. 9,599,740, issued Mar. 21, 2017, entitled USER INTERFACES FOR UTILITY LOCATORS; U.S. Pat. No. 9,625,602, issued Apr. 18, 2017, entitled SMART PERSONAL COMMUNICATION DEVICES AS USER INTERFACES; U.S. Pat. No. 9,632,199, issued Apr. 25, 2017, entitled INDUCTIVE CLAMP DEVICES, SYSTEMS, AND METHODS; U.S. Pat. No. 9,634,878, issued Apr. 25, 2017, entitled SYSTEMS AND METHODS FOR DATA TRANSFER USING SELF-SYNCHRONIZING QUADRATURE AMPLITUDE MODULATION (QAM); United States Patent Application, filed Apr. 25, 2017, entitled SYSTEMS AND METHODS FOR LOCATING AND/OR MAPPING BURIED UTILITIES USING VEHICLE-MOUNTED LOCATING DEVICES; U.S. Pat. No. 9,638,824, issued May 2, 2017, entitled QUAD-GRADIENT COILS FOR USE IN LOCATING SYSTEMS; United States Patent Application, filed May 9, 2017, entitled BORING INSPECTION SYSTEMS AND METHODS; U.S. Pat. No. 9,651,711, issued May 16, 2017, entitled HORIZONTAL BORING INSPECTION DEVICE AND METHODS; U.S. Pat. No. 9,684,090, issued Jun. 20, 2017, entitled NULLED-SIGNAL LOCATING DEVICES, SYSTEMS, AND METHODS; U.S. patent application Ser. No. 15/670,845, filed Aug. 7, 2016, entitled HIGH FREQUENCY AC-POWERED DRAIN CLEANING AND INSPECTION APPARATUS & METHODS; U.S. Pat. No. 9,746,572, issued Aug. 29, 2017, entitled ELECTRONIC MARKER DEVICES AND SYSTEMS; U.S. Pat. No. 9,769,366, issued Sep. 19, 2017, entitled SELF-GROUNDING TRANSMITTING PORTABLE CAMERA CONTROLLER FOR USE WITH PIPE INSPECTION SYSTEMS; U.S. Pat. No. 9,784,837, issued Oct. 10, 2017, entitled OPTICAL GROUND TRACKING APPARATUS, SYSTEMS & METHODS; U.S. Pat. No. 9,835,564, issued Dec. 5, 2017, entitled MULTI-CAMERA PIPE INSPECTION APPARATUS, SYSTEMS, AND METHODS; U.S. patent application Ser. No. 15/846,102, filed Dec. 18, 2017, entitled SYSTEMS AND METHOD FOR ELECTRONICALLY MARKING, LOCATING AND VIRTUALLY DISPLAYING BURIED UTILITIES; U.S. patent application Ser. No. 15/866,360, filed Jan. 9, 2018, entitled TRACKED DISTANCE MEASURING DEVICES, SYSTEMS, AND METHODS; U.S. Pat. No. 9,891,337, issued Feb. 13, 2018, entitled UTILITY LOCATOR TRANSMITTER DEVICES, SYSTEMS, and METHODS WITH DOCKABLE APPARATUS; U.S. Pat. No. 9,927,368, issued Mar. 27, 2018, entitled SELF-LEVELING INSPECTION SYSTEMS AND METHODS; U.S. Pat. No. 9,927,545, issued Mar. 27, 2018, entitled MULTI-FREQUENCY LOCATING SYSTEMS & METHODS; U.S. Pat. No. 9,928,613, issued Mar. 27, 2018, entitled GROUND TRACKING APPARATUS, SYSTEMS, AND METHODS; U.S. patent application Ser. No. 15/250,666, filed Mar. 27, 2018, entitled PHASE-SYNCHRONIZED BURIED OBJECT TRANSMITTER AND LOCATOR METHODS AND APPARATUS; U.S. Pat. No. 10,001,425, issued Jun. 19, 2018, entitled PORTABLE CAMERA CONTROLLER PLATFORM FOR USE WITH PIPE INSPECTION SYSTEM; U.S. Pat. No. 10,009,582, issued Jun. 26, 2018, entitled PIPE INSPECTION SYSTEM WITH REPLACEABLE CABLE STORAGE DRUM; U.S. Pat. No. 10,042,072, issued Aug. 7, 2018, entitled OMNI-INDUCER TRANSMITTING DEVICES AND METHODS; U.S. patent application Ser. No. 16/049,699, filed Jul. 30, 2018, entitled OMNI-INDUCER TRANSMITTING DEVICES AND METHODS; U.S. Pat. No. 10,073,186, issued Sep. 11, 2018, entitled KEYED CURRENT SIGNAL UTILITY LOCATING SYSTEMS AND METHODS; U.S. Pat. No. 10,105,723, issued Oct. 23, 2018, entitled TRACKABLE DIPOLE DEVICES, METHODS, AND SYSTEMS FOR USE WITH MARKING PAINT STICKS; U.S. Pat. No. 10,162,074, issued Dec. 25, 2018, entitled UTILITY LOCATORS WITH RETRACTABLE SUPPORT STRUCTURES AND APPLICATIONS THEREOF; United States Patent Application, filed Dec. 31, 2018, entitled ADJUSTABLE VARIABLE RESOLUTION INSPECTION SYSTEMS AND METHODS; U.S. patent application Ser. No. 16/241,864, filed Jan. 7, 2019, entitled TRACKED DISTANCE MEASURING DEVICES, SYSTEMS, AND METHODS; U.S. patent application Ser. No. 16/255,524, filed Jan. 23, 2019, entitled RECHARGEABLE BATTERY PACK ONBOARD CHARGE STATE INDICATION METHODS AND APPARATUS; U.S. patent application Ser. No. 16/382,136, filed Apr. 11, 2019, entitled GEOGRAPHIC MAP UPDATING METHODS AND SYSTEMS; U.S. Pat. No. 10,274,632, issued Apr. 20, 2019, entitled UTILITY LOCATING SYSTEMS WITH MOBILE BASE STATION; U.S. Pat. No. 10,288,997, issued May 14, 2019, entitled ROTATING CONTACT ASSEMBLIES FOR SELF-LEVELING CAMERA HEADS; U.S. patent application Ser. No. 29/692,937, filed May 29, 2019, entitled BURIED OBJECT LOCATOR; U.S. patent application Ser. No. 16/443,789, filed Jun. 17, 2019, entitled MULTI-DIELECTRIC COAXIAL PUSH-CABLES AND ASSOCIATED APPARATUS; U.S. patent application Ser. No. 16/449,187, filed Jun. 21, 2019, entitled ELECTROMAGNETIC MARKER DEVICES FOR BURIED OR HIDDEN USE; U.S. Pat. No. 10,353,103, issued Jul. 16, 2019, entitled SELF-STANDING MULTI-LEG ATTACHMENT DEVICES FOR USE WITH UTILITY LOCATORS; U.S. Pat. No. 10,401,526, issued Sep. 3, 2019, entitled BURIED UTILITY MARKER DEVICES, SYSTEMS, AND METHODS; U.S. Pat. No. 10,371,305, issued Aug. 6, 2019, entitled DOCKABLE TRIPODAL CAMERA CONTROL UNIT; U.S. patent application Ser. No. 16/559,576, filed Sep. 3, 2019, entitled VIDEO PIPE INSPECTION SYSTEMS WITH VIDEO INTEGRATED WITH ADDITIONAL SENSOR DATA; U.S. patent application Ser. No. 16/680,383, filed Nov. 11, 2019, entitled HEAT EXTRACTION ARCHITECTURE FOR COMPACT VIDEO CAMERA HEADS; U.S. patent application Ser. No. 16/676,292, filed Nov. 6, 2019, entitled ROBUST IMPEDANCE CONTROLLED SLIP RINGS; U.S. patent application Ser. No. 16/687,057, filed Nov. 18, 2019, entitled PIPE INSPECTION AND/OR MAPPING CAMERA HEADS, SYSTEMS, AND METHODS; U.S. patent application Ser. No. 16/701,085, filed Dec. 2, 2019, entitled MAP GENERATION BASED ON UTILITY LINE POSITION AND ORIENTATION ESTIMATES; U.S. Patent Application 62/943, 164, filed Dec. 3, 2019, entitled INTEGRAL DUAL CLEANER CAMERA DRUM SYSTEMS AND METHODS; U.S. Pat. No. 10,555,086, issued Feb. 4, 2020, entitled MAGNETIC FIELD CANCELING AUDIO SPEAKERS FOR USE WITH BURIED UTILITY LOCATORS OR OTHER DEVICES; U.S. Pat. No. 10,557,824, issued Feb. 11, 2020, entitled RESILIENTLY DEFORMABLE MAGNETIC FIELD TRANSMITTER CORES FOR USE WITH UTILITY LOCATING DEVICES AND SYSTEMS; U.S. Pat. No. 10,564,309, issued Feb. 18, 2020, entitled SYSTEMS AND METHODS FOR UNIQUELY IDENTIFYING BURIED UTILITIES IN A MULTI-UTILITY ENVIRONMENT; U.S. Pat. No. 10,569,952, issued Feb. 25, 2020, entitled MARKING PAINT APPLICATOR FOR USE WITH PORTABLE UTILITY LOCATOR; U.S. Provisional Patent Application 62/984,768, filed Mar. 3, 2020, entitled DOCKABLE CAMERA REEL AND CCU SYSTEM; U.S. patent application Ser. No. 16/810,788, filed Mar. 5, 2019, entitled MAGNETICALLY RETAINED DEVICE HANDLES; U.S. patent application Ser. No. 16/833,426, filed Mar. 27, 2020, entitled LOW COST, HIGH PERFORMANCE SIGNAL PROCESSING IN A MAGNETIC-FIELD SENSING BURIED UTILITY LOCATOR SYSTEM; U.S. Pat. No. 10,608,348, issued Mar. 31, 2020, entitled DUAL ANTENNA SYSTEMS WITH VARIABLE POLARIZATION; U.S. Provisional Patent Application 63/012,480, filed Apr. 20, 2020, entitled UTILITY LOCATING DEVICES EMPLOYING MULTIPLE SPACED APART GNSS ANTENNAS; U.S. Provisional Patent Application 63/015,692, filed Apr. 27, 2020, entitled SPATIALLY AND PROCESSING-BASED DIVERSE REDUNDANCY FOR RTK POSITIONING; U.S. Pat. No. 10,670,766, issued Jun. 2, 2020, entitled UTILITY LOCATING SYSTEMS, DEVICES, AND METHODS USING RADIO BROADCAST SIGNALS; U.S. Pat. No. 10,690,795, issued Jun. 23, 2020, entitled LOCATING DEVICES, SYSTEMS, AND METHODS USING FREQUENCY SUITES FOR UTILITY DETECTION; U.S. patent application Ser. No. 16/908, 625, filed Jun. 22, 2020, entitled ELECTROMAGNETIC MARKER DEVICES WITH SEPARATE RECEIVE AND TRANSMIT ANTENNA ELEMENTS; U.S. patent application Ser. No. 16/921,775, filed Jul. 6, 2020, entitled AUTO-TUNING CIRCUIT APPARATUS AND METHODS; U.S. Pat. No. 8,587,648, issued Jul. 14, 2020, entitled SELF-LEVELING CAMERA HEADS; U.S. Provisional Patent Application 63/055,278, filed Jul. 22, 2020, entitled VEHICLE-BASED UTILITY LOCATING USING PRINCIPAL COMPONENTS; U.S. Provisional Patent Application 63/063,151, filed Aug. 7, 2020, INSPECTION SYSTEM PUSH-CABLE GUIDE APPARATUS; U.S. Pat. No. 10,764,541, issued Sep. 1, 2020, entitled COAXIAL VIDEO PUSH-CABLES FOR USE IN INSPECTION SYSTEMS; U.S. patent application Ser. No. 17/014,646, filed Sep. 8, 2020, entitled INTEGRATED FLEX-SHAFT CAMERA SYSTEM WITH HAND CONTROL; U.S. patent application Ser. No. 16/588,834, issued Sep. 9, 2019, entitled VIDEO INSPECTION SYSTEM WITH WIRELESS ENABLED CABLE STORAGE DRUM; U.S. Pat. No. 10,777,919, issued Sep. 15, 2020, entitled MULTIFUNCTION BURIED UTILITY LOCATING CLIPS; U.S. patent application Ser. No. 17/020,487, filed Sep. 14, 2020, entitled ANTENNA SYSTEMS FOR CIRCULARLY POLARIZED RADIO SIGNALS; United States Provisional Patent Application 63/091,67, filed Oct. 14, 2020, entitled ELECTRONIC MARKER-BASED NAVIGATION SYSTEMS AND METHODS FOR USE IN GNSS-DEPRIVED ENVIRONMENTS; U.S. Pat. No. 10,809,408, issued Oct. 20, 2020, entitled DUAL SENSED LOCATING SYSTEMS AND METHODS; U.S. patent application Ser. No. 17/182, 123, filed Feb. 22, 2021, entitled UTILTIY LOCATING SYSTEM WITH MOBILE BASE STATION; U.S. Pat. No. 10,928,538, issued Feb. 23, 2021, entitled KEYED CURRENT SIGNAL UTILITY LOCATING SYSTEMS AND METHODS; U.S. Pat. No. 10,935,686, issued Mar. 2, 2021, entitled UTILITY LOCATING SYSTEM WITH MOBILE BASE STATION; U.S. Pat. No. 10,983,239, filed Apr. 12, 2021, entitled MULTI-FREQUENCY LOCATING SYSTEMS AND METHODS; U.S. Pat. No. 10,983,239, issued Apr. 20, 2021, entitled MAGNETIC UTILITY LOCATOR DEVICES AND METHODS; U.S. Pat. No. 10,983,240, issued Apr. 20, 2021, entitled MULTI-FREQUENCY LOCATING SYSTEMS AND METHODS; U.S. Pat. No. 10,989,830, issued Apr. 27, 2021, entitled UTILITY LOCATOR APPARATUS AND SYSTEMS; U.S. patent application Ser. No. 17/235,507, filed Apr. 20, 2021, entitled UTILITY LOCATING DEVICES EMPLOYING MULTIPLE SPACED APART GNSS ANTENNAS; U.S. patent application Ser. No. 17/241,676, filed Apr. 27, 2021, entitled SPATIALLY AND PROCESSING-BASED DIVERSE REDUNDANCY; U.S. Pat. No. 11,029,439, issued Jun. 8, 2021, entitled UTILITY LOCATOR APPARATUS, SYSTEMS, AND METHODS; U.S. Provisional Patent Application 63/212,713, filed Jun. 20, 2021, entitled SYSTEMS AND METHODS FOR DETERMINING AND DISTINGUISHING BURIED OBJECTS USING ARTIFICIAL INTELLIGENCE; U.S. Pat. D922,885, filed Jun. 22, 2021, entitled BURIED OBJECT LOCATOR; U.S. patent application Ser. No. 17/379,867, filed Jul. 19, 2021, entitled LOCATING DEVICES, SYSTEMS, AND METHODS USING FREQUENCY SUITES FOR UTILITY DETECTION; U.S. Pat. No. 11,073,632, issued Jul. 27, 2021, entitled LOCATING DEVICES, SYSTEMS, AND METHODS USING FREQUENCY SUITES FOR UTILITY DETECTIONS; U.S. patent application Ser. No. 17/382, 040, filed Jul. 21, 2021, entitled VEHICLE-BASED UTILITY LOCATING USING PRINCIPAL COMPONENTS;

U.S. patent application Ser. No. 17/397,587, filed Aug. 9, 2021, entitled UTILITY LOCATING SYSTEMS, DEVICES, AND METHODS USING RADIO BROADCAST SIGNALS; U.S. Pat. No. 11,092,712, issued Aug. 17, 2021, entitled UTILITY LOCATING SYSTEMS, DEVICES, AND METHODS USING RADIO BROADCAST SIGNALS; U.S. patent application Ser. No. 17/461,833, filed Aug. 30, 2021, entitled COMBINED SATELLITE NAVIGATION AND RADIO TRANSCEIVER ANTENNA DEVICES; U.S. Pat. No. 11,117,150, issued Sep. 14, 2021, entitled TRACKABLE DIPOLE DEVICES, METHODS, AND SYSTEMS FOR USE WITH MARKING PAINT STICKS; U.S. patent application Ser. No. 17/175,594, filed Sep. 27, 2021, entitled SYSTEMS AND METHODS FOR DETERMINING AND DISTINGUISHING BURIED OBJECTS USING ARTIFICIAL INTELLIGENCE; U.S. Pat. No. 11,156,737, issued Oct. 26, 2021, entitled BURIED OBJECT LOCATOR APPARATUS AND METHODS; U.S. patent application Ser. No. 17/467,438, filed Sep. 6, 2021, entitled SATELLITE AND MAGNETIC FIELD SONDE APPARATUS AND METHODS; U.S. Provisional Patent Application 63/241,489, filed Sep. 7, 2021, entitled GNSS POSITIONING METHODS AND DEVICES USING PPP-RTK/SSR OR SIMILAR CORRECTION DATA; U.S. Provisional Patent Application 63/248,995, filed Sep. 27, 2021, entitled SYSTEMS AND METHODS FOR DETERMINING AND DISTINGUISHING BURIED OBJECTS USING ARTIFICIAL INTELLIGENCE; U.S. patent application Ser. No. 17/499,810, filed Oct. 12, 2021, entitled BURIED OBJECT APPARATUS AND METHODS; U.S. patent application Ser. No. 17/522,857, filed Nov. 9, 2021, entitled WIRELESS BURIED PIPE AND CABLE LOCATING SYSTEMS; U.S. Pat. No. 11,175,427, issued Nov. 16, 2021, entitled BURIED UTILITY LOCATING SYSTEMS WITH OPTIMIZED WIRELESS DATA COMMUNICATION; U.S. patent application Ser. No. 17/531,533, filed Nov. 19, 2021, entitled INPUT MULTIPLEXED SIGNAL PROCESSING APPARATUS AND METHODS; U.S. patent application Ser. No. 17/540,231, filed Dec. 1, 2021, entitled AUTO-TUNING CIRCUIT APPARATUS AND METHODS; U.S. patent application Ser. No. 17/540,239, filed Dec. 1, 2021, entitled DUAL SENSED LOCATING SYSTEMS AND METHODS; U.S. Pat. No. 11,204,246, issued Dec. 21, 2021, entitled DUAL SENSED LOCATING SYSTEMS AND METHODS; and U.S. Provisional Patent Application 63/306,088, filed Feb. 2, 2022, entitled UTILITY LOCATING SYSTEMS AND METHODS WITH FILTER TUNING FOR POWER GRID FLUCTUATIONS. The content of each of the above-described patents and applications is incorporated by reference herein in its entirety.

In use, the transmitter device 530 may apply current to a utility line 560 inducing a magnetic field 570 that may be sensed by the utility locator device 520. Simultaneously, the geolocation of the utility locator device 520 as well as other utility locating system 500 devices having one or more multi-antenna apparatus 510 may be determined fully or in part via the GNSS antenna portion of each multi-antenna apparatus 510 with the associated GNSS receiver. Further, the radio antenna portion of each multi-antenna apparatus 510, as well as like radios in the laptop 550 or other computing device in other embodiments (e.g., smart phone, tablet, or the like), may communicate data of each device of the utility locating system 500 with other devices in the utility locating system 500. For instance, the multitude of multi-antenna apparatus 510 may create a Bluetooth, BLE, Wi-Fi or other WLAN, or other mesh network for sharing data including that related to utility line positions and geolocation data received at each device. The mesh network may be or share aspects with that described in U.S. Pat. No. 8,264,226, issued Sep. 11, 2012, entitled SYSTEM AND METHOD FOR LOCATING BURIED PIPES AND CABLES WITH A MAN PORTABLE AND TRANSMITTER IN A MESH NETWORK the contents of which is incorporated by reference herein in its entirety.

Figure 6A:
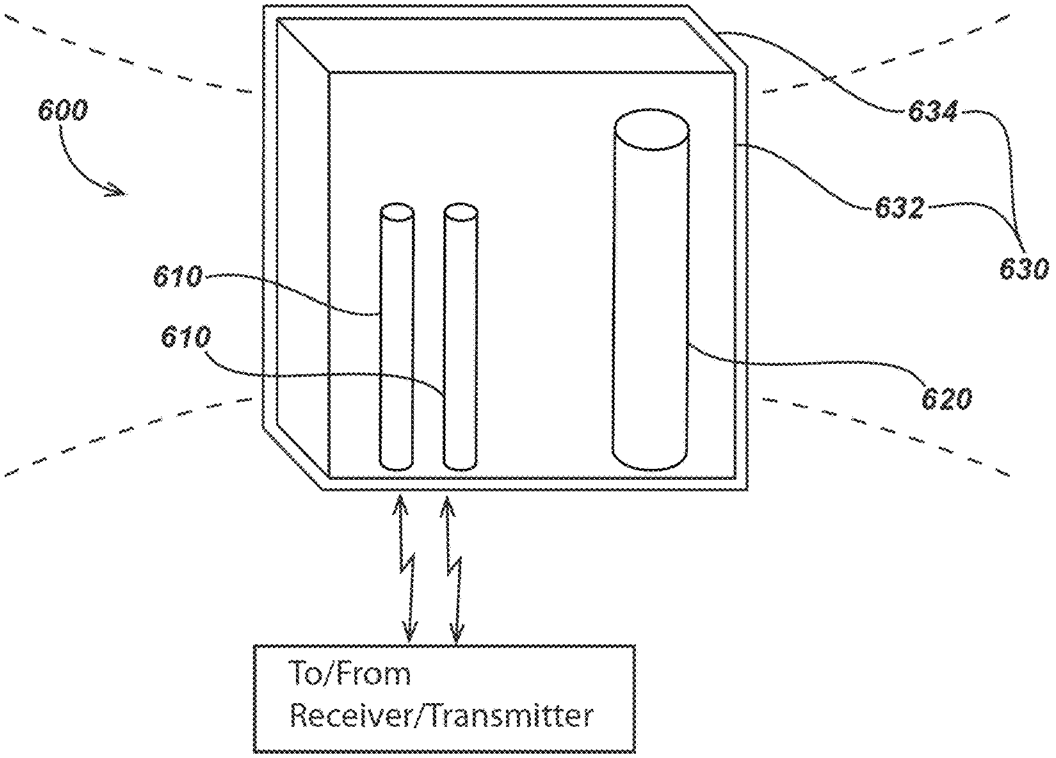
FIG. 6A is an illustration of an antenna in keeping with the present disclosure that includes a UV resistance treated Polymethylpentene housing.
Figure 6B:
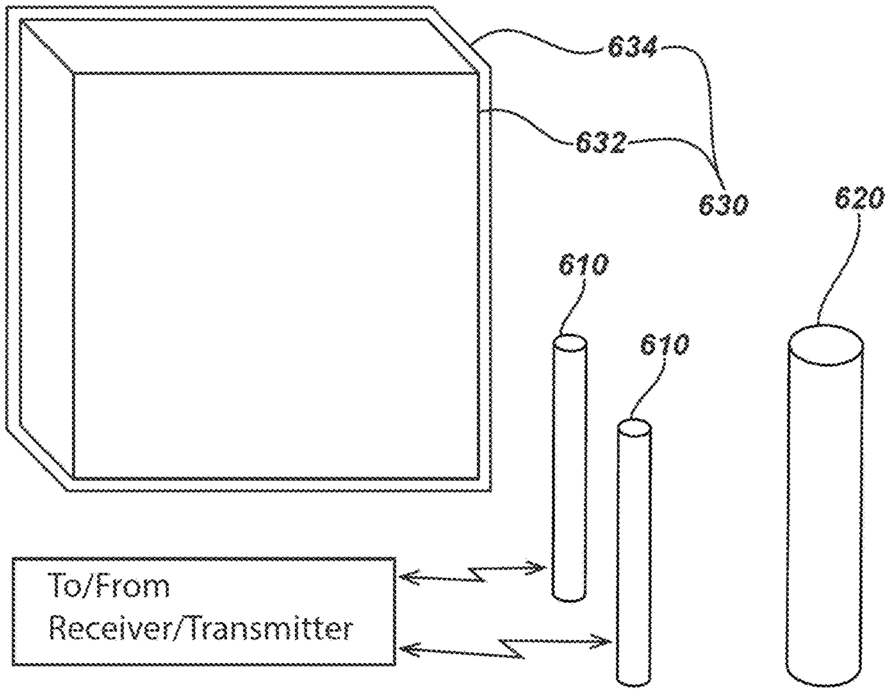
FIG. 6B is an exploded view of the antenna from FIG. 6A.

Turning to FIGS. 6A and 6B, an antenna embodiment 600 in accordance with aspects of the present disclosure is illustrated. The antenna 600 may include one or more conductive masts or other antenna elements 610. The antenna elements 610 may be used for transmitting electromagnetic signals, generally in the radio frequency spectrum, when electrical current is driven to the antenna elements 610 from a transmitter and/or receiving electromagnetic signals when further communicated to a receiver. Some embodiments, such as the antenna 600 of FIGS. 6A and 6B, may include one or more non-driven conductive elements 620 that may contribute to the overall radiating pattern of antenna 600. Likewise, in some embodiments, a multitude of transmission lines (e.g., transmission lines 182, 184, and 186 of FIG. 1D) may be included in antenna 600 for providing current from a receiver/transmitter to the antenna elements 610. The lengths and impedances of transmission lines (e.g., transmission lines 182, 184, and 186 of FIG. 1D) may be chosen to control the radiation pattern.

The antenna 600 may further include a housing 630 made of or including a Polymethylpentene element 632 that has a UV treatment 634 to prevent the Polymethylpentene element 632 from degrading in sunlight. In some embodiments, the Polymethylpentene element 632 may be TPX material commercially available from Mitsui Chemical, Inc.

Figure 7:
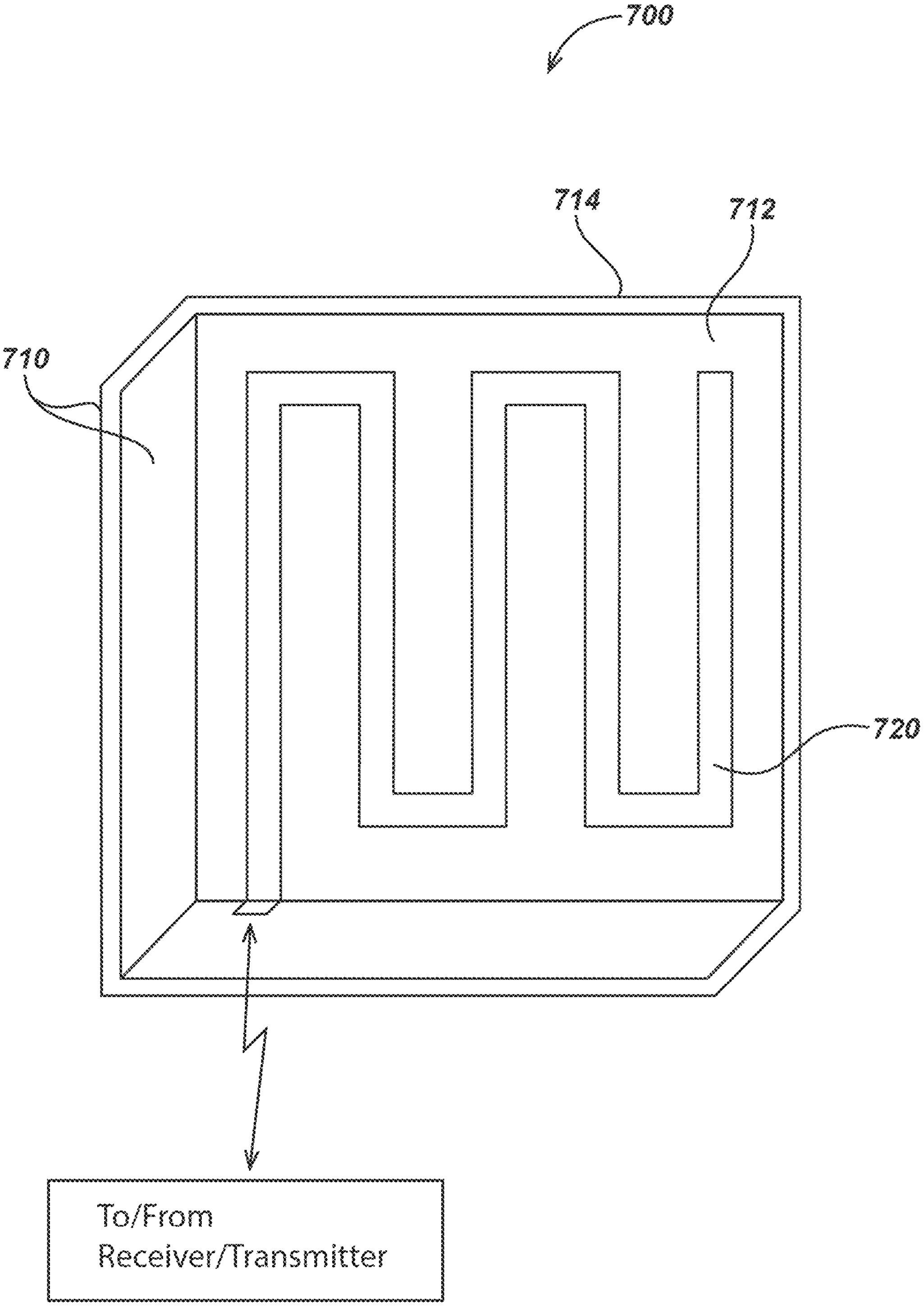
FIG. 7 is an illustration of an antenna in keeping with the present disclosure constructed by selective plating onto or into a UV resistance treated Polymethylpentene housing.

Turning to FIG. 7, an antenna embodiment 700 in accordance with aspects of the present disclosure is illustrated. The antenna 700 may include a housing 710 or other substrate made of or including a Polymethylpentene element 712 that has UV treatment 714 to prevent the Polymethylpentene element 712 from degrading in sunlight. In some embodiments, the Polymethylpentene element 712 may be TPX material commercially available from Mitsui Chemical, Inc. The antenna 700 may include an antenna element 720 for receiving and/or transmitting radio signals formed in or on the housing 710 by selective plating one or more conductive circuit patterns. In use, the antenna element 720 may further couple to a receiver/transmitter to receive and process radio signals and/or generate one or more radio signals for transmission. Such a receiver/transmitter may further include one or more filters including those for filtering out of band energy at the antenna 700.

Figure 8:
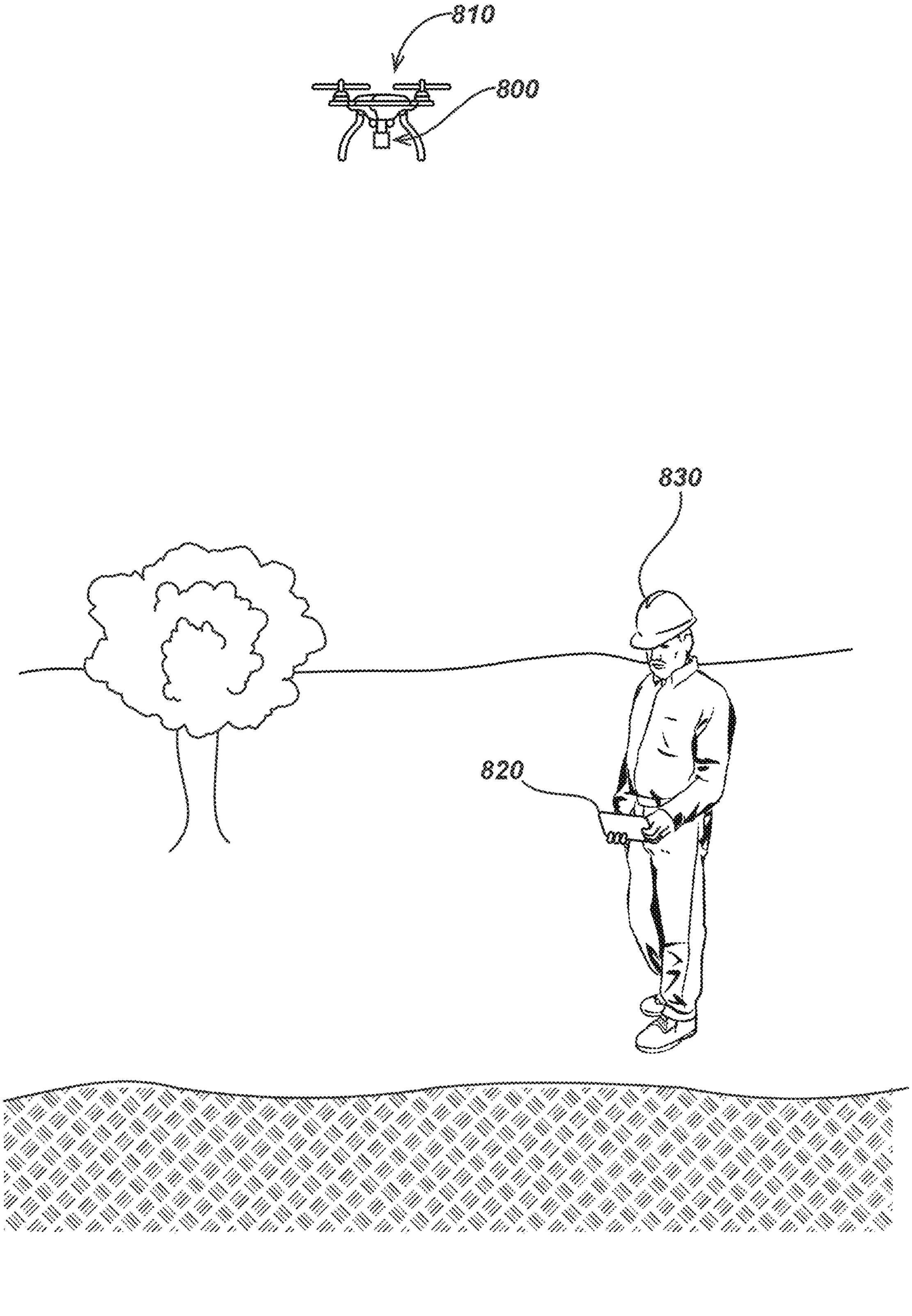
FIG. 8 is an illustration of an antenna in keeping with the present disclosure used in a drone or other unmanned aerial vehicle.

Turning to FIG. 8, an antenna embodiment 800 is illustrated which may be or share aspects with the antenna 600 of FIGS. 6A and 6B and antenna 700 of FIG. 7 further deployed in a drone 810 or other unmanned aerial vehicle. In some embodiments, the antenna 800 of FIG. 8 may instead be or share aspects with the antenna 100 of FIGS. 1A-1C, antenna 160 of FIG. 1D, antenna 200 of FIG. 2, multi-antenna apparatus 300 of FIGS. 3A-3D, and/or multi-antenna apparatus 400 of FIG. 4. The drone 810 may be controlled via radio signals controls which may be supplied from a controller 820 manipulated by a user 830. As the antenna 800 may have a Polymethylpentene housing having ideal dielectric properties, the drone 810 may further benefit from the lightweight qualities of the Polymethylpentene. As the drone 810 may be used outside in sunlight, the UV treatment may allow such a Polymethylpentene housing antenna to be used outside.

Those of skill in the art would understand that information and signals, such as video and/or audio signals or data, control signals, or other signals or data may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The disclosure is not intended to be limited to the aspects shown herein, but is to be accorded the full scope consistent with the specification and drawings, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c.

The previous description of the disclosed aspects is provided to enable any person skilled in the art to make or use embodiments of aspects of the disclosure. Various modifications to these aspects will be readily apparent to those skilled in the art, and the generic principles defined herein may be applied to other aspects without departing from the spirit or scope of the disclosure. Thus, the presently claimed invention is not intended to be limited to the aspects shown herein, but is to be accorded the widest scope consistent with the following claims and their equivalents.

The invention claimed is:

1. A multi-antenna apparatus, comprising:

a housing enclosing a global navigation satellite system (GNSS) antenna and a radio antenna;

the radio antenna positioned beneath the GNSS antenna, the radio antenna comprising:

a shielding element dimensioned to substantially match the horizontal cross-section dimensions of the GNSS antenna;

a ground plane element dimensioned to substantially match the horizontal cross-section dimensions of the GNSS antenna;

an array of conductive mast elements configured to receive radio signals and driven by an electrical current to transmit radio signals, wherein the array of conductive mast elements are positioned between the shielding element and ground plane element; and a conductive and hollow tubular passage positioned between and providing a passageway through the shielding element and ground plane element such that wiring may pass through the hollow tubular passage for communicating signal with the GNSS antenna;

wherein the array of conductive mast elements and the hollow tubular passage are positioned relative to one another between the shielding element and ground plane element such that when the electrical current is supplied to drive the array of conductive mast elements to transmit radio signals, and a radiation of the radio signals from the driven array of conductive mast elements in combination with radiation off the non-driven hollow tubular passage has a substantially omnidirectional azimuthal radiation pattern.

2. The multi-antenna apparatus of claim 1, further including one or more filters for filtering to remove out of band energy from the GNSS antenna.

3. The multi-antenna apparatus of claim 1, further including an antenna tuning mechanism, wherein the radio antenna is detuned at one or more frequencies of the GNSS antenna.

4. The multi-antenna apparatus of claim 1, further including an antenna tuning mechanism, wherein the radio antenna is tuned for Bluetooth, Bluetooth low energy (BLE), Wi-Fi or other wireless local area network (WLAN), or cellular radio bands.

5. The multi-antenna apparatus of claim 1, wherein the housing comprises ultraviolet (UV) resistance treated Polymethylpentene.

6. The housing of claim 5, wherein the Polymethylpentene is TPX material commercially available from Mitsui Chemicals, Inc. further treated to resist damage from UV exposure.

7. The multi-antenna apparatus of claim 5, wherein the array of conductive mast elements comprises conventional antenna elements seated in the housing.

8. The multi-antenna apparatus of claim 1, wherein the multi-antenna apparatus is incorporated in a utility locator device.

9. The multi-antenna apparatus of claim 1, wherein the multi-antenna apparatus is incorporated in a mesh network of multi-antenna apparatus.

10. The multi-antenna apparatus of claim 1, wherein the radio antenna includes one or more non-driven conductive elements configured to contribute to the substantially omnidirectional azimuthal radiation pattern.

11. The multi-antenna apparatus of claim 1, wherein the array of conductive mast elements includes one or more non-driven conductive elements configured to contribute to the substantially omnidirectional azimuthal radiation pattern.

12. The multi-antenna apparatus of claim 1, wherein the array of conductive mast elements is formed on or in the housing by selective plating of conductive material.

13. The multi-antenna apparatus of claim 1, further including one or more non-driven conductive elements that contribute to generating a predefined radiating pattern.

14. The multi-antenna apparatus of claim 1, wherein the multi-antenna apparatus is incorporated in a drone or other unmanned aerial vehicle.

* * * * *